US012747706B2

(12) United States Patent
Gernone et al.

(10) Patent No.: US 12,747,706 B2
(45) Date of Patent: Sep. 29, 2026

(54) METHODS AND APPARATUS FOR A CRYOGENIC FUEL DISTRIBUTION SYSTEM USING A BYPASS

(71) Applicants: GE Avio S.r.l., Rivalta di Torino (IT); General Electric Company, Evendale, OH (US)

(72) Inventors: Mirko Gernone, Bari (IT); Douglas D. Turner, Lynn, MA (US)

(73) Assignees: GE Avio S.r.l., Rivalta di Torino (IT); General Electric Company, Evendale, OH (US)

( * ) Notice: Subject to any disclaimer, the term of this patent is extended or adjusted under 35 U.S.C. 154(b) by 0 days.

(21) Appl. No.: 19/080,487

(22) Filed: Mar. 14, 2025

(65) Prior Publication Data

US 2025/0297580 A1 Sep. 25, 2025

(30) Foreign Application Priority Data

Mar. 20, 2024 (IT) ........................ 102024000006271

(51) Int. Cl.
*F02C 9/26* (2006.01)
*F02C 3/22* (2006.01)
(Continued)

(52) U.S. Cl.
CPC ................ *F02C 9/263* (2013.01); *F02C 3/22* (2013.01); *F02C 7/232* (2013.01); *F02C 7/236* (2013.01); *F17C 7/04* (2013.01); *F17C 2205/0326* (2013.01); *F17C 2221/033* (2013.01); *F17C 2221/035* (2013.01);
(Continued)

(58) Field of Classification Search
CPC .. F02C 3/22; F02C 7/232; F02C 7/236; F02C 9/263; F05D 2240/36
See application file for complete search history.

(56) References Cited

U.S. PATENT DOCUMENTS 6,939,392 B2 9/2005 Huang et al.
7,272,932 B2 9/2007 Watson et al.
(Continued)

FOREIGN PATENT DOCUMENTS

GB 2240813 A 8/1991
WO 2015046177 A1 4/2015

OTHER PUBLICATIONS

Italian Patent Office, "Office Action and Search Report," issued Sep. 24, 2024 in connection with Italian Patent Application No. 2024000006271, 12 pages.
(Continued)

*Primary Examiner* — Scott J Walthour
(74) *Attorney, Agent, or Firm* — Hanley, Flight & Zimmerman, LLC

(57) ABSTRACT

Systems, apparatus, articles of manufacture, and methods are disclosed that include a fuel distribution system for an engine, the fuel distribution system comprising: a first pump downstream of a fuel tank; a first motor coupled to the first pump; a second pump downstream of the first pump; a second motor coupled to the second pump; a third pump downstream of the second pump, the third pump having an inlet and an outlet; a bypass pathway from the outlet of the third pump to the inlet of the third pump; and a recirculation valve, the recirculation valve in line with the bypass pathway.

16 Claims, 14 Drawing Sheets

(51) Int. Cl.
*F02C 7/232* (2006.01)
*F02C 7/236* (2006.01)
*F17C 7/04* (2006.01)

(52) U.S. Cl.
CPC ................. *F17C 2223/0161* (2013.01); *F17C 2227/0135* (2013.01); *F17C 2265/066* (2013.01); *F17C 2270/0189* (2013.01)

(56) References Cited

U.S. PATENT DOCUMENTS

| | | | |
|---|---|---|---|
| 10,989,117 | B2 | 4/2021 | Roberge |
| 11,674,443 | B2 | 6/2023 | Gibson et al. |
| 2005/0279079 | A1* | 12/2005 | Baryshnikov ........... F02C 7/232 60/39.094 |
| 2007/0017206 | A1 | 1/2007 | Baryshnikov et al. |
| 2010/0257839 | A1 | 10/2010 | Watkins et al. |
| 2013/0186059 | A1 | 7/2013 | Epstein et al. |
| 2013/0192244 | A1 | 8/2013 | Ripley et al. |
| 2013/0219909 | A1 | 8/2013 | Nenmeni et al. |
| 2014/0182264 | A1 | 7/2014 | Weisgerber et al. |
| 2020/0340408 | A1* | 10/2020 | Yamamoto ................ F02C 9/30 |
| 2021/0025594 | A1* | 1/2021 | Hiromitsu ............. F23D 11/107 |
| 2021/0340908 | A1 | 11/2021 | Boucher et al. |
| 2022/0145801 | A1* | 5/2022 | Mccurdy Gibson ...... F02C 3/22 |
| 2022/0307421 | A1 | 9/2022 | Sibbach et al. |
| 2024/0401518 | A1 | 12/2024 | Minas |

OTHER PUBLICATIONS

European Patent Office, "Extended European Search Report," issued in connection with European Patent Application No. 25164584.2, dated Jul. 18, 2025, 34 pages.

* cited by examiner

METHODS AND APPARATUS FOR A CRYOGENIC FUEL DISTRIBUTION SYSTEM USING A BYPASS

RELATED APPLICATION

This patent claims priority to Italian Patent Application No. 102024000006271, filed on Mar. 20, 2024 and titled "METHODS AND APPARATUS FOR A CRYOGENIC FUEL DISTRIBUTION SYSTEM USING A BYPASS," which is incorporated herein by reference in its entirety.

FIELD OF THE DISCLOSURE

This disclosure relates generally to a two-phase cryogenic fuel system for a vehicle and, more particularly, to a cryogenic fuel distribution system using a bypass for an aircraft engine fuel system.

BACKGROUND

An aircraft generally includes a fuselage, a pair of wings, and a propulsion system that provides thrust. The propulsion system typically includes one or more aircraft engines, such as turbofan jet engines. The turbofan jet engine(s) may be typically mounted to a respective one of the wings of the aircraft, such as in a suspended position beneath the wing, mounted to the wing using a pylon.

The aircraft includes a fuel delivery assembly that generally includes a fuel tank and one or more fuel lines that extend between the fuel tank and the aircraft engines. Traditional aircraft engines are powered by aviation turbine fuel, which may be a combustible hydrocarbon liquid fuel, such as a Kerosene-type fuel. The aviation turbine fuel is a relatively power-dense fuel that is relatively easy to transport and stays in a liquid phase through most ambient operating conditions for aircraft.

Emissions from conventional aircraft having aircraft engines powered by aviation turbine fuel may be reduced by utilizing a hydrogen fuel or a cryogenic fuel. Hydrogen fuel is not a relatively energy-dense fuel in its gaseous form and has a relatively low boiling point and a relatively low freezing point.

Figure 1:
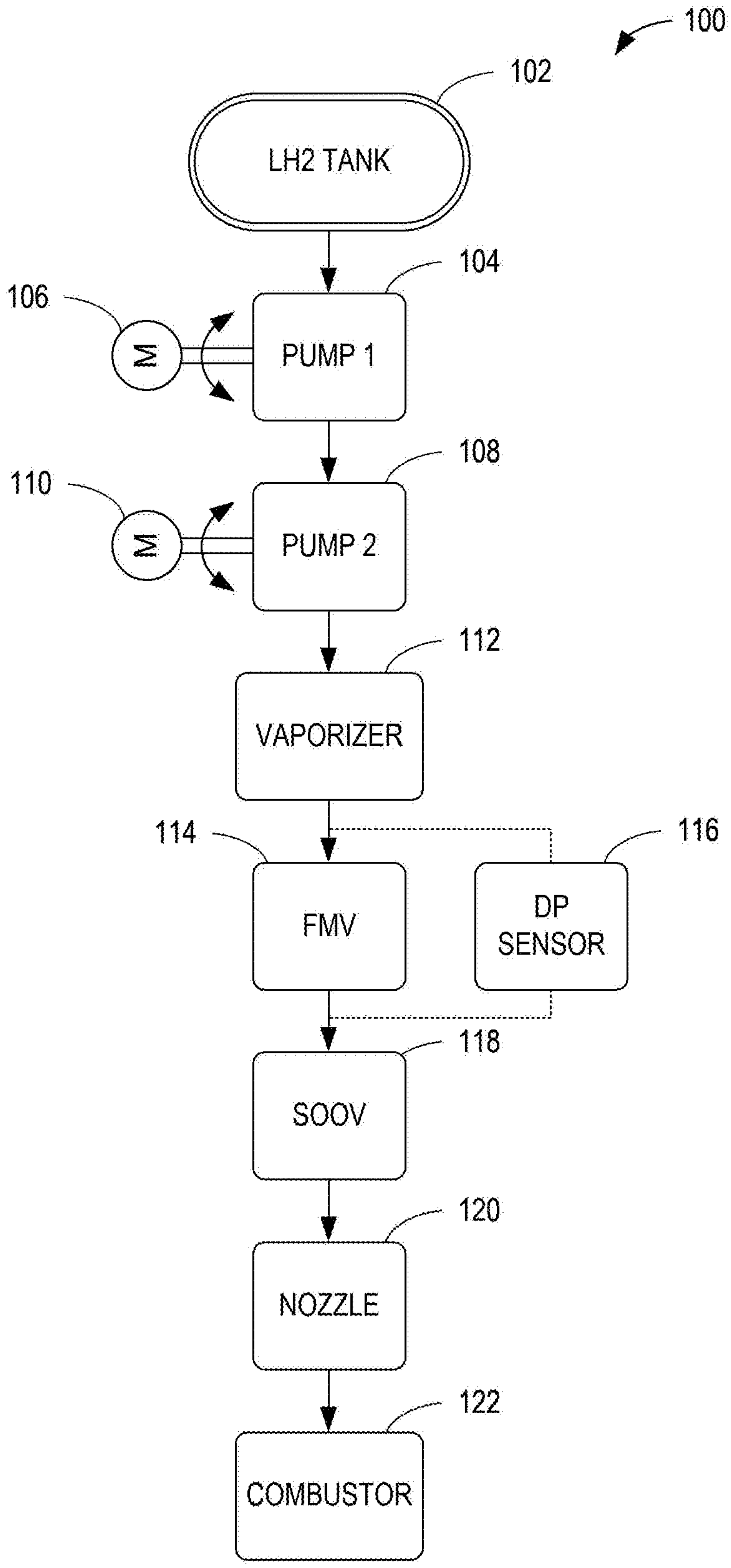
FIG. 1 (PRIOR ART)
FIG. 1 is a block diagram of an example prior flow of fuel from a fuel tank to a combustor.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

In addition to the aircraft described herein, which typically feature engines mounted on pylons suspended beneath the wings or integrated into wings of aircraft, examples herein include aircraft with engines mounted on the aft fuselage and empennage. This configuration may place an engine at the rear of an aircraft, away from the wings.

Furthermore, reference is made herein to gas turbine engines which includes various types such as turboprop engines which drive propellers to generate thrust, open fan engines which use a fan without a protective casing, and open rotor engines which feature unshrouded and contra-rotating propellers.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time +1 second.

As used herein, a fluid is defined as a substance that flows and takes the shape of its container. A fluid can include liquids, gases, and vapors. A liquid is a state of matter characterized by a definite volume without a defined shape. Liquids used herein are incompressible. A gas is a state of matter characterized as having no shape or volume with a shape defined as the shape of its container. Vapor refers specifically to the gaseous phase of a substance that is a liquid or a solid at room temperature and pressure.

As used herein, the term cryogenic is used to describe the production and behavior of materials and substances at very low (e.g., below −150 degrees Celsius) temperatures.

As used herein, a critical point of a substance is the temperature and pressure at which a liquid phase and a gas phase of the substance have the same density, and the distinction between the liquid phase and the gas phase is nonexistent.

As used herein, a supercritical fluid is a substance at a temperature and pressure above its critical point where distinct liquid and gas phases do not exist. Supercritical fluids have properties that are intermediate between those of gases and liquids.

As used herein, a saturation dome is a region or on a diagram that represents a range of temperatures and pressures at which a substance can exist as both a liquid and a gas. The saturation dome is bounded by the liquid-vapor saturation curve.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The term combustor is used herein to describe a component where fuel is mixed with compressed air and burned to produce high-temperature, high-pressure gas. The gas then expands through the turbine section to produce thrust or mechanical power. The combustor must efficiently mix fuel and air, maintain stable combustion, and withstand high temperatures and pressures. Examples of technologies used for combustors include (1) rich burn technology where a fuel-rich (more fuel than stoichiometrically required for complete combustion) mixture is burned to reduce nitrogen oxide emissions, (2) rich quench lean burn technology where a fuel-rich mixture is burned, the combustion is quickly quenched to reduce the nitrogen oxide formation, and then the remaining lean mixture is burned, and (3) lean burn technology where a lean mixture (more air than stoichiometrically required for complete combustion) is burned to reduce fuel consumption and emissions in gas turbine engines.

As used herein, a lean burn premixer, also referred to as a premixer, is a component in a gas turbine engine that helps to achieve efficient combustion by mixing fuel with a high volume of air before entering the combustion chamber. Lean burn premixers are used throughout the disclosure to mix fuel with air before injecting the mixture into the combustor.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The terms "low" and "high", or their respective comparative degrees (e.g., -er, where applicable), when used with a compressor, a turbine, a shaft, or spool components, etc. each refer to relative speeds within an engine unless otherwise specified. For example, a "low pressure turbine" or "low speed turbine" defines a component configured to operate at a rotational speed, such as a maximum allowable rotational speed, lower than a "high pressure turbine" or "high speed turbine" at the engine. Similarly, the terms "high" and "low" in the context of high pressure pumps and low pressure pumps within a fuel distribution system are relative and depend on the specific design and requirements of an engine including the high and low pressure pumps. The characterization of the pressure levels as high or low is contingent upon the intended function of the pump, the function of the system the pump is used within, and the specifications of the system in use.

In example aspects disclosed herein, a fuel system for a vehicle having an engine is provided. The example engine is a hydrogen engine, and the fuel system is configured to distribute hydrogen fuel to the engine. Generally, a hydrogen fuel distribution system includes a fuel tank for holding the hydrogen fuel in a liquid phase (e.g., at least partially within a liquid phase or substantially completely within a liquid phase), a fuel delivery assembly extending from the fuel tank to the engine for providing the hydrogen fuel from the fuel tank to the engine, a heat exchanger (also known as a vaporizer) in communication with the fuel delivery assembly for heating the hydrogen fuel in the liquid phase to a gaseous phase, to a supercritical phase, or both, and a high pressure pump in fluid communication with the fuel delivery assembly for inducing a flow of the hydrogen fuel through the fuel delivery assembly to the engine.

In examples used herein, liquid hydrogen fuel is the fuel stored in a fuel tank. Examples herein may be extended to any cryogenic fuel and gaseous fuels, such as liquid nitrogen gas, methane, etc.

Typical components of the fuel delivery assembly may include a low pressure pump, a high pressure pump, motors to drive the pumps, a fuel metering valve, a shutoff overspeed valve, a throttling valve, a bypass valve, and at least one nozzle. The configuration of the fuel delivery assembly serves different functions, but the individual components provide a particularized function.

As used herein, a low pressure (LP) pump is a mechanism that draws fuel from a fuel tank and delivers or pumps the fuel to a high pressure pump. The low pressure pump provides a steady and consistent supply of fuel typically in the range of 40-60 pounds per square inch (psi). In contrast, a high pressure (HP) pump is a mechanism that includes at least one stage to increase the pressure of input fuel to the pump to a desired pressure, typically in the range of 500-800 psi. The term pump shall be intended as a single pump, a multistage pump, or could be multiple pumps achieving a particular function.

As used herein, a motor is a mechanism that converts energy. Examples herein include motors to drive pumps. A motor that is attached to a pump may get an electrical signal from a controller such as a Full Authority Digital Engine Control (FADEC). The FADEC typically determines a desired output pressure based on feedback sensors and accordingly determines the desired output of a pump. The FADEC then sends an electrical signal to the motor attached to the pump to have the motor convert the electrical signal to mechanical energy, driving the pump.

As used herein, a fuel metering valve (FMV) is a fuel control unit that controls the amount of fuel that flows through the valve to downstream components. The fuel metering valve is controlled by an engine control unit of a FADEC and is determined based on feedback about the engine's requirements and the current fuel pressure.

As used herein, a shutoff overspeed valve is a safety valve that prevents a fuel delivery system from distributing fuel in the context of exceeding a predefined limit. The valve is used in scenarios where a rotational speed of the system (e.g., speeds associated with pumps or turbines) exceed desired operational levels. The shutoff overspeed valve is activated when a parameter, such as speed, surpasses the desired limit. The flow of fuel is accordingly interrupted to mitigate potential risks (e.g., mechanical failure) associated with continued operation.

As used herein, a throttling valve is a mechanical device that regulates pressure at one point, P, of a system in order to maintain a constant delta pressure between the throttling valve and the point, P.

As used herein, a bypass valve (BPV) is a regulator that controls upstream pressure at an inlet of the bypass valve. Excess pressure on the inlet is relieved by the bypass valve opening.

As used herein, a nozzle, or fuel injection nozzle, is a mechanical structure that allows for the directing and dispensing of fuel. Examples disclosed herein include at least one nozzle in a combustion portion or an engine. In the event there is more than one nozzle, the fuel is distributed by a fuel manifold or fuel plenum and supplied to the plurality of nozzles.

As used herein, a valve is a mechanical device that controls the flow of a fluid (e.g., fuel) by opening, closing, or partially obstructing a passage. In the examples herein, the valves may be bypass valves that are controlled by a FADEC or other controller. The FADEC or other controller command the state of the valve to change to be open, closed, or partially closed. Other example types of valves include exponential valves, gate valves, butterfly valves, shutoff valves, diverting valves, etc.

In some examples herein, the configuration of a fuel assembly varies. The fuel assembly described includes a vaporizer, a fuel metering valve, and a throttling or bypass valve. Anytime a vaporizer, fuel metering valve, and a throttling or bypass valve are used, a vaporizer, fuel metering valve, and a throttling or bypass valve make up a fuel assembly.

Turning now to the figures, FIG. 1 is a block diagram of an example prior flow of fuel in a fuel metering system 100 from a fuel tank 102 to a combustor 122. The fuel metering system includes the fuel tank 102, a first pump 104, a first motor 106, a second pump 108, a second motor 110, a vaporizer 112, a fuel metering valve (FMV) 114, a pressure differential (DP) sensor 116, a shutoff overspeed valve (SOOV) 118, a nozzle 120, and the combustor 122.

In assembly, the fuel metering system 100 enables flow from the fuel tank 102 to the combustor 122 by flowing fuel through a sequence of components in series. The fuel tank 102 is coupled to an inlet of the first pump 104 which has the first motor 106 attached. The outlet of first pump 104 is coupled to an inlet of the second pump 108 which has the second motor 110 attached. An outlet of the second pump 108 is coupled to an inlet of the vaporizer 112. An outlet of the vaporizer 112 is coupled to an inlet of the FMV 114. The FMV 114 has an outlet coupled to an inlet of the SOOV 118. The SOOV 118 has an outlet coupled to the nozzle 120, which feeds into the combustor 122. The DP sensor 116 is coupled to the inlet and outlet of the FMV 114.

In operation, the fuel metering system 100 regulates the amount of fuel delivered from the fuel tank 102 to the combustor 122. The first pump 104, a low pressure pump which is driven by the first motor 106, supplies a constant flow of fuel to the second pump 108, which is a high pressure pump. The fuel metering system 100 is generally designed such that the fuel exiting the first pump 104 is in the liquid phase such to avoid cavitation or inefficiency in the second pump 108.

The second pump 108 is driven by the second motor 110 and increases the pressure of the fuel. The fuel metering system 100 is generally designed such that the fuel exiting the second pump 108 is at a higher pressure as well as in the supercritical or gaseous phase.

The FMV 114, which is controlled by feedback from the DP sensor 116, regulates the precise amount of fuel to be delivered based on real-time engine conditions. The SOOV 118 is optionally included to intervene if a rotational speed of the engine exceeds a predetermined limit. The fuel continues its distribution path through at least one nozzle 120, which directs the flow of fuel into the combustor 122 which combusts the fuel to generate thrust in the engine.

Figure 2:
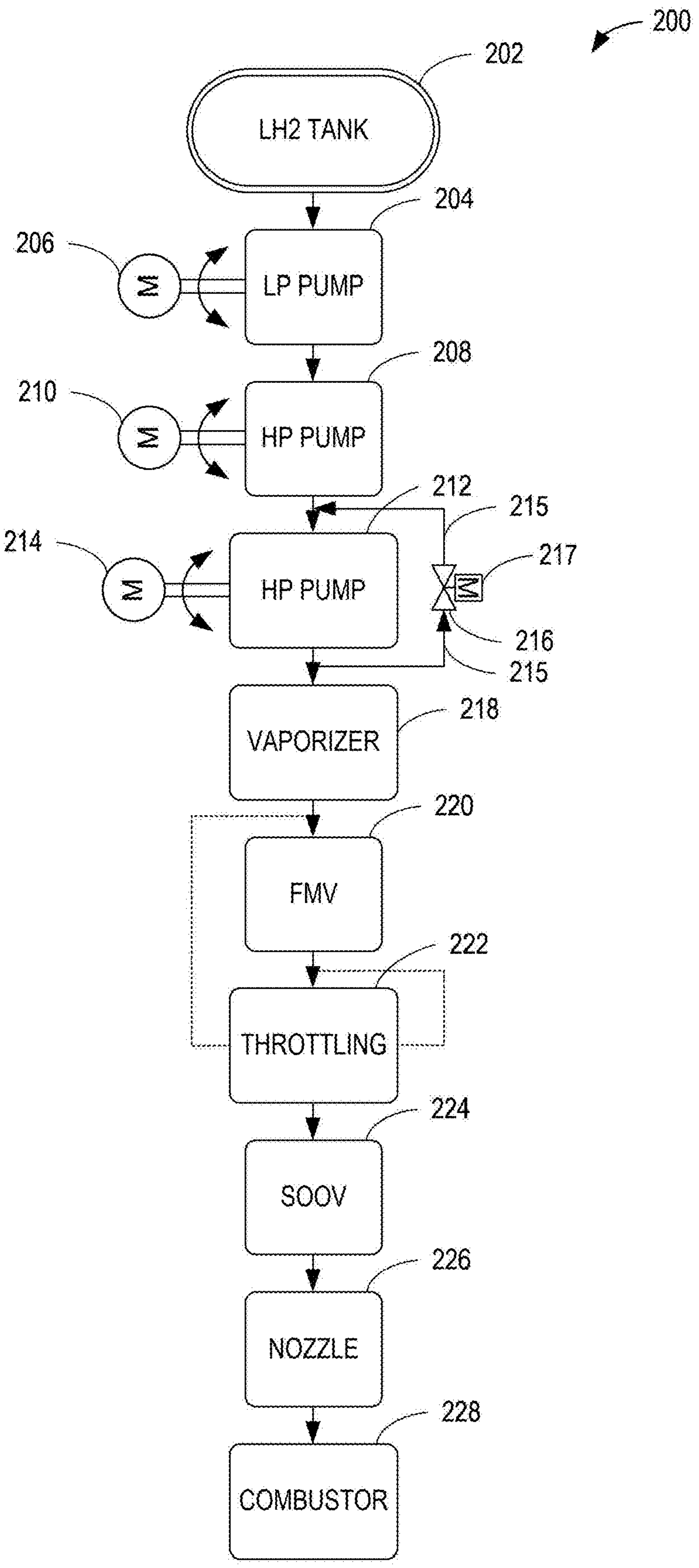
FIG. 2 is a block diagram of a first example flow of fuel from a fuel tank to a combustor with a bypass pathway.

FIG. 2 is a block diagram of a first hydrogen fuel distribution system 200 demonstrating example flow of fuel from a fuel tank to a combustor with a bypass pathway. The first hydrogen fuel distribution system 200 includes a fuel tank 202, a low pressure (LP) pump 204, a first motor 206, a first high pressure (HP) pump 208, a second motor 210, a second HP pump 212, a third motor 214, a bypass pathway 215, a recirculation valve 216, an actuator 217, a vaporizer 218, an FMV 220, a throttling valve 222, an SOOV 224, a nozzle 226, and a combustor 228. In this example, the first and second HP pumps 208, 212 are centrifugal.

In assembly, the first hydrogen fuel distribution system 200 enables fuel flow from the fuel tank 202 to the combustor 228 by flowing through a sequence of components in series. The fuel tank 202 is coupled to an inlet of the LP pump 204, which is attached to the first motor 206. An outlet of the LP pump 204 is coupled to an inlet of the first HP pump 208, which is attached to the second motor 210. An outlet of the first HP pump 208 is coupled to an inlet of the second HP pump 212, which is attached to the third motor 214. From there, the flow of fuel can divert back to the inlet of the second HP pump through the bypass pathway 215, which has the recirculation valve 216 with the actuator 217 in line.

If the flow of fuel does not divert back to the inlet of the second HP pump through the bypass pathway 215, the first hydrogen fuel distribution system 200 couples the outlet of the HP pump 212 to an inlet of the vaporizer 218. An outlet of the vaporizer 218 is coupled to an inlet of the FMV 220. An outlet of the FMV is coupled to an inlet of the throttling valve 222. The throttling valve 222 is connected to the inlet and outlet of the FMV 220, with an outlet of the throttling valve 222 coupled to the SOOV 224. An outlet of the SOOV 224 is coupled to an inlet of the nozzle 226. An outlet of the nozzle 226 is coupled to an inlet of the combustor 228.

In operation, the LP pump 204, which is driven by the first motor 206 supplies a constant pressure of fuel to the first HP pump 208. The first HP pump 208, which is driven by the second motor 210, increases the pressure up to the critical pressure of the fuel before the fuel reaches the second HP pump 212. The second HP pump 212 maintains the pressure working point at the best efficiency point (BEP), which is the point along a pump performance curve where efficiency of the pump is the highest.

The first hydrogen fuel distribution system 200 is designed such that the fuel exiting the LP pump 204 is in the liquid phase to avoid cavitation or inefficiency in the first HP pump 208. The fuel exiting the first HP pump 208 is at a higher pressure as well as in the supercritical or gaseous phase. The fuel exiting the second HP pump 212 is in the supercritical or gaseous phase with the second HP pump 212 at the BEP.

After the second HP pump 212, the fuel either flows through the bypass pathway 215 to the recirculation valve 216 with the actuator 217 or to the vaporizer 218.

If the fuel flows to the bypass pathway 215, the actuator 217 opens the recirculation valve 216 to allow supercritical hydrogen at the outlet of the second HP pump 212 to mix with the supercritical hydrogen at the inlet of the second HP pump 212 to help ensure that the pressure of the fuel is evenly distributed while preventing stratification and air bubbles in the fuel.

If the fuel flows to the vaporizer 218, the fuel is vaporized before flowing to the FMV 220. The fuel exiting the vaporizer 218 is in a vaporized state. The FMV 220 regulates the amount of fuel moving through the FMV 220. The throttling valve 222 adjusts the inlet conditions of the throttling valve 222 based on the pressure differential across the FMV 220 to effectively "throttle" or regulate the fuel flow. For example, if the delta pressure across the FMV 220 is above a predetermined threshold, the throttling valve 222 widens to decrease the pressure at the outlet of the FMV 220. If the delta pressure across the FMV 220 is below the predetermined threshold, the throttling valve 222 constricts or closes to keep the pressure at the outlet of the FMV 220 constant. The SOOV 224 then functions optionally to intervene if a rotational speed of the engine exceeds a predetermined limit. The fuel continues its distribution path through at least one nozzle 226, which directs the flow of fuel into the combustor 228 which combusts the fuel to generate thrust in the engine.

Figure 3:
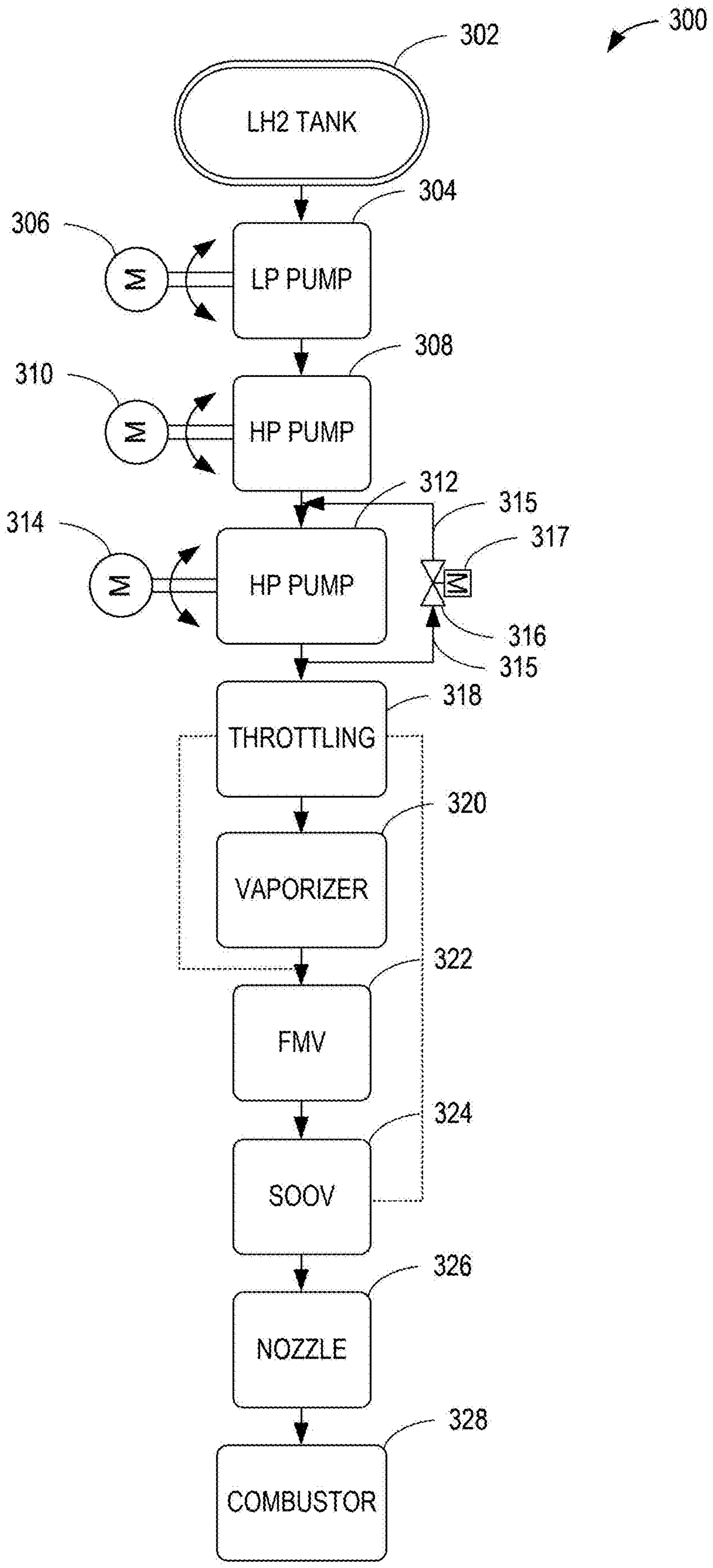
FIG. 3 is a block diagram of a second example flow of fuel from a fuel tank to a combustor with a bypass pathway.

FIG. 3 is a block diagram of a second hydrogen fuel distribution system 300 demonstrating example flow of fuel from a fuel tank to a combustor with a bypass pathway. The second hydrogen fuel distribution system 300 includes a fuel tank 302, an LP pump 304, a first motor 306, a first HP pump 308, a second motor 310, a second HP pump 312, a third motor 314, a bypass pathway 315, a recirculation valve 316, a FADEC controlled actuator 317, a throttling valve 318, a vaporizer 320, an FMV 322, a SOOV 324, a nozzle 326, and a combustor 328. In this example, the first and second HP pumps 308, 312 are centrifugal.

In assembly, the second hydrogen fuel distribution system 300 enables fuel flow from the fuel tank 302 to the combustor 328 by flowing through a sequence of components in series. The fuel tank 302 is coupled to an inlet of the LP pump 304, which has the first motor 206 attached. An outlet of the LP pump 304 is coupled to an inlet of the first HP pump 308, which is attached to the second motor 310. An outlet of the first HP pump 308 is coupled to an inlet of the second HP pump 312, which is attached to the third motor 314. An outlet of the second HP pump 312 is coupled to the bypass pathway 315 and an inlet of the throttling valve 318. The bypass pathway 315 couples the outlet of the second HP pump 312 to the inlet of the second HP pump 312 through the recirculation valve 316 with the FADEC controlled actuator 317 attached.

If the fuel is not diverted through the bypass pathway 315, the fuel flows to the inlet of the throttling valve 318. The throttling valve 318 is connected to an inlet of the FMV 322 and the SOOV 324 to determine pressure. An outlet of the throttling valve 318 is coupled to an inlet of the vaporizer 320. An outlet of the vaporizer 320 is coupled to the inlet of the FMV 322. An outlet of the FMV 322 is coupled to an inlet of the SOOV 324. An outlet of the SOOV 324 is coupled to an inlet of the nozzle 326. An outlet of the nozzle 326 is coupled to an inlet of the combustor 328.

In operation, the LP pump 304, which is driven by the first motor 306 supplies a constant pressure of fuel to the first HP pump 308. The first HP pump 308, which is driven by the second motor 310, increases the pressure of the fuel before the fuel reaches the second HP pump 312. The second HP pump 312 maintains the pressure working point at the best efficiency point (BEP).

The second hydrogen fuel distribution system 300 is designed such that the fuel exiting the LP pump 304 is in the liquid phase to avoid cavitation or inefficiency in the first HP pump 308. The fuel exiting the first HP pump 308 is at a higher pressure as well as in the supercritical or gaseous phase. The fuel exiting the second HP pump 312 is in the supercritical or gaseous phase at the BEP.

After the second HP pump 312, the fuel either flows through the bypass pathway 315 to the recirculation valve 316 with the FADEC controlled actuator 317 or to the throttling valve 318. The FADEC commands the actuator 317 to open or close the recirculation valve 316 based on whether the pressure of the fuel at the outlet of the second HP pump 312 is above a predetermined threshold. The predetermined threshold is related to the pressure in a combustor 328.

If the fuel flows to the bypass pathway 315, then the actuator 317 actuates the recirculation valve 316 so that the supercritical hydrogen at the outlet of the second HP pump 312 mixes with the supercritical hydrogen at the inlet of the second HP pump 312 to help ensure that the pressure in the fuel is evenly distributed while preventing stratification and the presence of air bubbles in the fuel.

If the fuel flows to the throttling valve 318, the fuel is regulated based on a pressure differential of the fuel between the inlet of the downstream FMV 322 and the downstream SOOV 324. The regulated fuel then flows to the vaporizer 320 to vaporize the fuel. The fuel is vaporized into a vapor state before flowing to the FMV 322. The FMV 322 regulates the amount of fuel through the FMV 322. The SOOV 324 then functions optionally to intervene if a rotational speed of the engine exceeds a predetermined limit (e.g., 110% of a nominal speed). The fuel continues its distribution path through at least one nozzle 326, which directs the flow of fuel into the combustor 328 which combusts the fuel to generate thrust in the engine.

Figure 4:
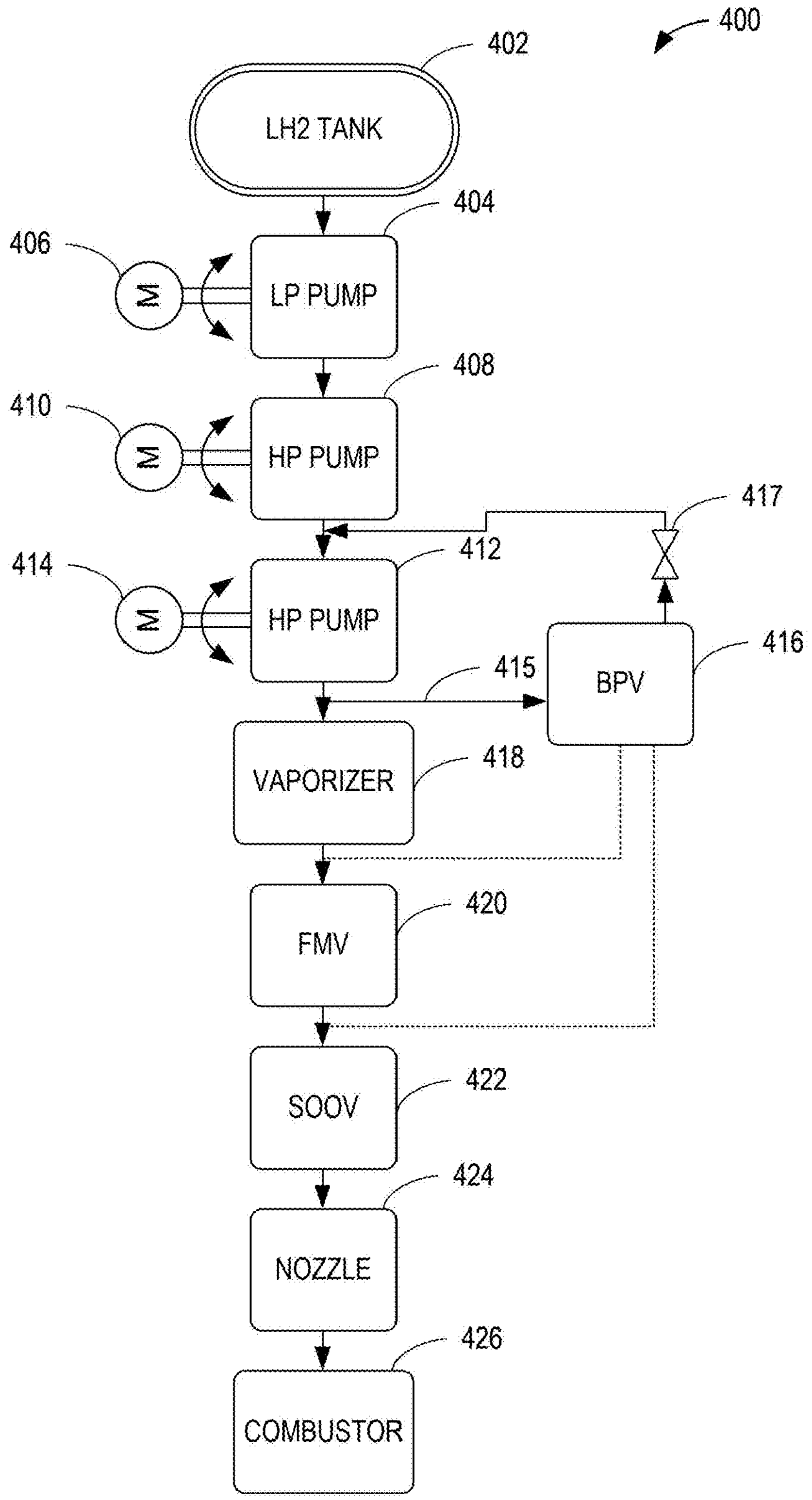
FIG. 4 is a block diagram of an example flow of fuel from a fuel tank to a combustor with a bypass pathway and a bypass valve upstream of a vaporizer.

FIG. 4 is a block diagram of a third hydrogen fuel distribution system 400 demonstrating an example flow of fuel from a fuel tank to a combustor with a bypass pathway and a bypass valve. The third hydrogen fuel distribution system 400 includes a fuel tank 402, an LP pump 404, a first motor 406, a first HP pump 408, a second motor 410, a second HP pump 412, a third motor 414, a bypass pathway 415, a bypass valve (BPV) 416, a recirculation valve 417, a vaporizer 418, an FMV 420, a SOOV 422, a nozzle 424, and a combustor 426. In this example, the first HP pump 408 is centrifugal, whereas the second HP pump 412 is a displacement pump.

In assembly, the third hydrogen fuel distribution system 400 enables fuel flow from the fuel tank 402 to the combustor 426 by flowing through a sequence of components in series. For example, the series of components can include the fuel tank 402, which is coupled to an inlet of the LP pump 404, which is attached to the first motor 406. An outlet of the LP pump 404 is coupled to an inlet of the first HP pump 408, which is attached to the second motor 410. An outlet of the first HP pump 408 is coupled to an inlet of the second HP pump 412, which is attached to the third motor 414. An outlet of the second HP pump 412 is coupled to the bypass pathway 415 as well as an inlet of the vaporizer 418. The bypass pathway 415 includes a connection to an inlet of the BPV 416. The BPV 416 is connected to an inlet of the FMV 420 and an outlet of the FMV 420 to determine pressure. The BPV 416 has an outlet coupled to the recirculation valve 417, which has an outlet coupled to the inlet of the second HP pump 412.

If the fuel does not enter the bypass pathway 415 because the BPV 416 remains closed, the fuel flows to the inlet of the vaporizer 418. An outlet of the vaporizer 418 is coupled to an inlet of the FMV 420. An outlet of the FMV 420 is coupled to an inlet of the SOOV 422. An outlet of the SOOV 422 is coupled to an inlet of the nozzle 424. An outlet of the nozzle 424 is coupled to an inlet of the combustor 426.

In operation, the LP pump 404, which is driven by the first motor 406 supplies a constant flow of fuel to the first HP pump 408. The first HP pump 408, which is driven by the second motor 410, increases the pressure of the fuel before the fuel reaches the second HP pump 412. The second HP pump 412 maintains the pressure working point at the best efficiency point (BEP).

The third hydrogen fuel distribution system 400 is designed such that the fuel exiting the LP pump 404 is in the liquid phase to avoid cavitation or inefficiency in the first HP pump 408. The fuel exiting the first HP pump 408 is at a higher pressure as well as in the supercritical or gaseous phase. The fuel exiting the second HP pump 412 is in the supercritical or gaseous phase at the BEP.

After the HP pump, the fuel either flows through the bypass pathway 415 to the BPV 416 before the recirculation valve 417 or to the vaporizer 418 based on whether the BPV 416 is open, which is determined based on whether the delta pressure across the FMV 420 is above a predetermined threshold. If the delta pressure across the FMV 420 is above the predetermined threshold, the BPV 416 opens to allow fuel flow through the BPV 416. If the delta pressure across the FMV 420 is below the predetermined threshold, the BPV 416 closes or remains closed to prevent fuel through the bypass pathway 415. The BPV 416 is a passive regulating valve that bypasses the flow in order to guarantee a constant delta pressure across the FMV 420.

If the fuel flows to the bypass pathway 315, the BPV 416 measures the pressure differential across the FMV 420. If the pressure differential is too high (e.g., 80 pounds per square inch), the BPV 416 opens, allowing flow through the recirculation valve 417 and back to the inlet of the second HP pump 412, where the fuel pressure is maintained at the BEP.

If the fuel flows to vaporizer 418, the fuel is vaporized into a vapor state before flowing to the FMV 420. The FMV 420 regulates the amount of fuel through the FMV 420. The SOOV 422 then functions optionally to intervene if a rotational speed of the engine exceeds a predetermined limit. The fuel continues its distribution path through at least one nozzle 424, which directs the flow of fuel into the combustor 426 which combusts the fuel to generate thrust in the engine (not shown) with which the fuel distribution system is associated.

Figure 5:
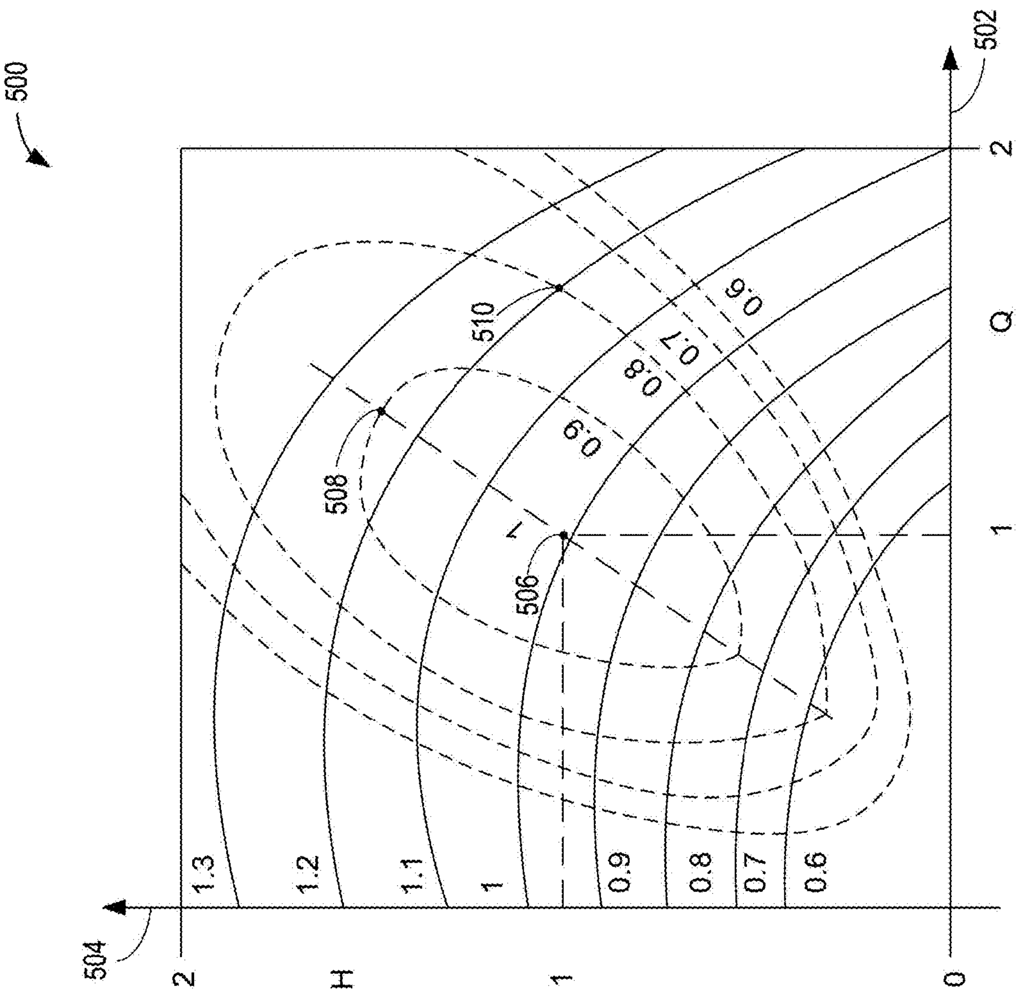
FIG. 5 is a graph of centrifugal pump efficiency at different pressure ratios as a function of volumetric flow.

FIG. 5 is a graph of fuel efficiency 500, demonstrated by a pressure ratio as a function of volumetric flow. The graph of fuel efficiency 500 includes an x-axis 502, which represents the volumetric flow of fuel, and a y-axis 504 which represents the pressure ratio (e.g., the head), a valved critical point 506, a first no valve critical point 508, and a second no valve critical point 510. The dotted lines represent the efficiency points, while the solid curves represents relationship between the head and the volumetric flow for different pump speeds.

FIG. 5 highlights the concept of best efficiency point (BEP). BEP refers to the operating point as a percentage or ratio of head to volumetric flow at which a centrifugal pump or turbine operates with its highest efficiency. This is shown in FIG. 5 as the point on the performance curve where the centrifugal pump or turbine maximizes its effectiveness. Operating at the BEP helps reduce energy consumption and optimizes a system's overall performance. The systems disclosed herein help to ensure operation of the fuel distribution system at BEP through the use of a dynamic pump system or by diverting the flow with displacement pumps.

In FIG. 5, the first no valve critical point 508 indicates a point at which the fuel metering system 100 without a feedback has a fixed demand, fixed combustor pressure, and fixed pump speed. In contrast, the second no valve critical point 510 indicates an increasing demand with a fixed pump speed. As shown in comparing the first no valve critical point 508 with the second no valve critical point, the efficiency drops from 1 to 0.8.

In FIG. 5, the valved critical point 506 indicates a fuel distribution system with a bypass pathway 200, 300, 400 as disclosed herein. The valved critical point 506 indicates both when the valve is open, and the valve is closed (both a fixed and increasing demand, fixed combustor pressure, and fixed centrifugal pump speed).

Figure 6:
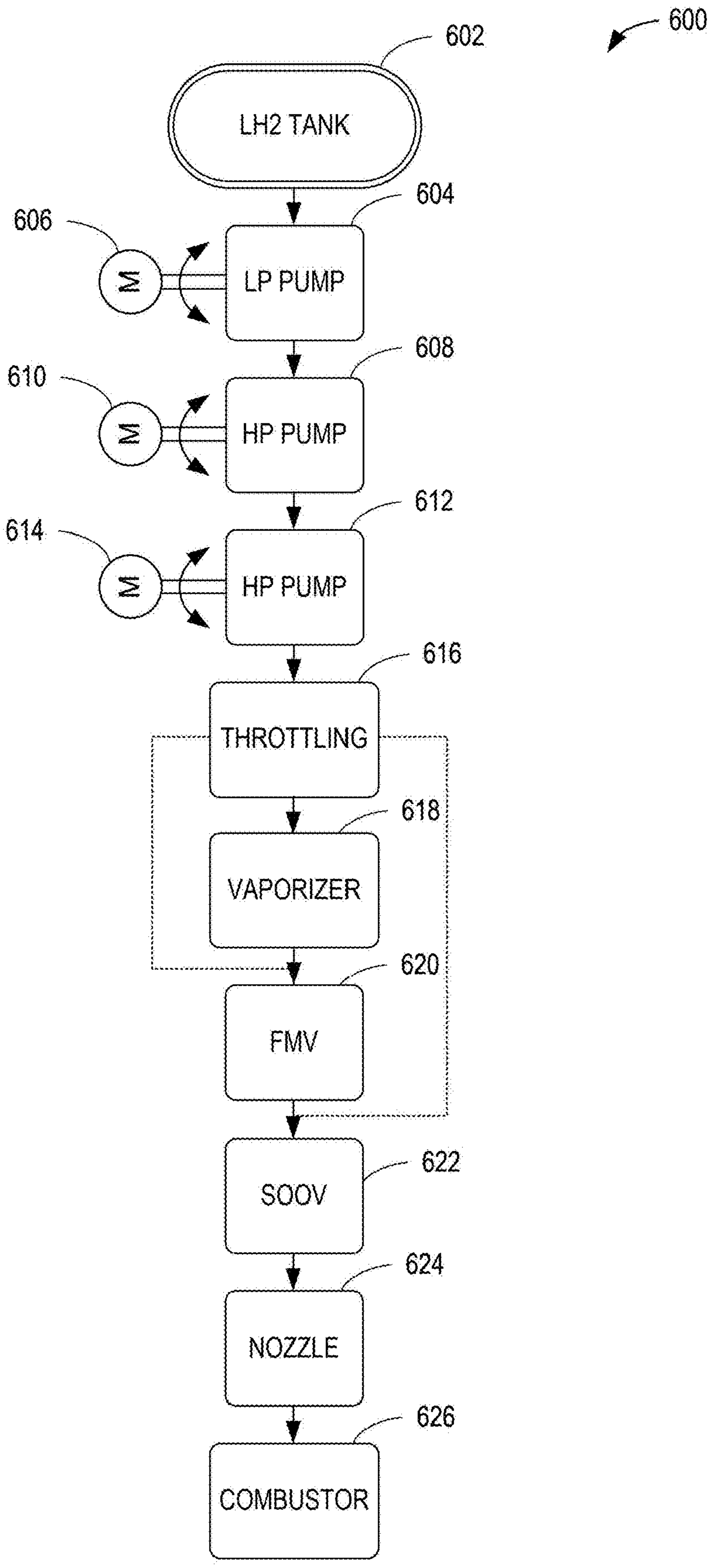
FIG. 6 is a block diagram of an example flow of fuel from a fuel tank to a combustor without a bypass pathway.

FIG. 6 is a block diagram of a fourth hydrogen fuel distribution system 600 demonstrating example flow of fuel from a fuel tank to a combustor without a bypass pathway. The fourth hydrogen fuel distribution system 600 includes a fuel tank 602, an LP pump 604, a first motor 606, a first HP pump 608, a second motor 610, a second HP pump 612, a third motor 614, a throttling valve 616, a vaporizer 618, an FMV 620, a SOOV 622, a nozzle 624, and a combustor 626. In this example, the first and second HP pumps 608, 612 are centrifugal.

In assembly, the fourth hydrogen fuel distribution system 600 enables fuel flow from the fuel tank 602 to the combustor 626 by flowing through a sequence of components in series. The fuel tank 602 is coupled to an inlet of the LP pump 604, which is attached to the first motor 606. An outlet of the LP pump 604 is coupled to an inlet of the first HP pump 608, which is attached to the second motor 610. An outlet of the first HP pump 608 is coupled to an inlet of the second HP pump 612, which is attached to the third motor 614. An outlet of the second HP pump 612 is coupled to an inlet of the throttling valve 616. The throttling valve 616 is connected to an inlet of the FMV 620 and an outlet of the FMV 620 to measure pressure. An outlet of the throttling valve 616 is coupled to an inlet of the vaporizer 618. An outlet of the vaporizer 618 is coupled to an inlet of the FMV 620. An outlet of the FMV 620 is coupled to an inlet of the SOOV 622. An outlet of the SOOV 622 is coupled to an inlet of the nozzle 624. An outlet of the nozzle 624 is coupled to an inlet of the combustor 626.

In operation, the LP pump 204, which is driven by the first motor 606, supplies a constant pressure of fuel to the first HP pump 608. The first HP pump 608, which is driven by the second motor 610, increases the pressure of the fuel before the fuel reaches the second HP pump 612. The second HP pump 612 maintains the pressure working point at the best efficiency point.

The fourth hydrogen fuel distribution system 600 is designed such that the fuel exiting the LP pump 604 is in the liquid phase to avoid cavitation or inefficiency in the first HP pump 608. The fuel exiting the first HP pump 608 is at a higher pressure as well as in the supercritical or gaseous phase. The fuel exiting the second HP pump 612 is in the supercritical or gaseous phase at the BEP.

After the HP pump, the fuel flows through the throttling valve 616. The throttling valve is connected to the inlet and outlet of the FMV 620 to measure the pressure differential across the FMV 620. The throttling valve effectively throttles the flow of fuel through the throttling valve 616 in accordance with the pressure differential. The greater the pressure differential, the more the throttling valve throttles the fuel.

The fuel then flows to the vaporizer 618, and the fuel is vaporized into a vapor state before flowing to the FMV 620. The FMV 620 regulates the amount of fuel through the FMV 620. The SOOV 622 then functions optionally to intervene if a rotational speed of the engine exceeds a predetermined limit. The fuel continues its distribution path through at least one nozzle 624, which directs the flow of fuel into the combustor 626 which combusts the fuel to generate thrust in the engine.

Figure 7:
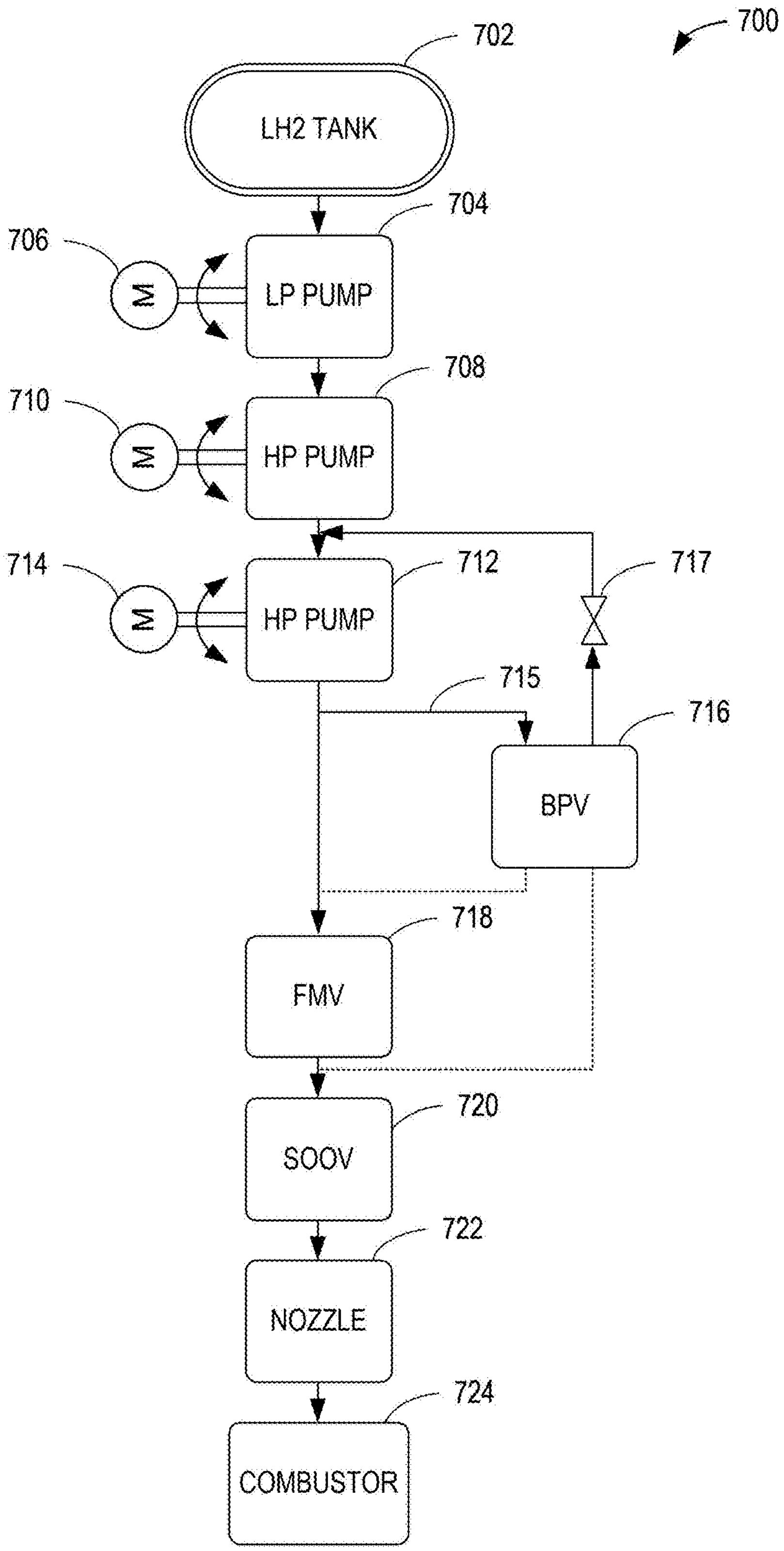
FIG. 7 is a block diagram of an example flow of fuel from a fuel tank to a combustor with a bypass pathway and without a vaporizer.

FIG. 7 is a block diagram of a fifth hydrogen fuel distribution system 700 demonstrating example flow of fuel from a fuel tank to a combustor with a bypass pathway and without a vaporizer. The fifth hydrogen fuel distribution system 700 includes a fuel tank 702, an LP pump 704, a first motor 706, a first HP pump 708, a second motor 710, a second HP pump 712, a third motor 714, a bypass pathway 715, a BPV 716, a valve 717, a FMV 718, a SOOV 720, a nozzle 722, and a combustor 724. In this example, the first HP pump 708 is centrifugal, whereas the second HP pump 712 is a displacement pump.

In assembly, the fifth hydrogen fuel distribution system 700 enables fuel flow from the fuel tank 702 to the combustor 724 by flowing through a sequence of components in series. The fuel tank 702 is coupled to an inlet of the LP pump 704, which is attached to the first motor 706. An outlet of the LP pump 704 is coupled to an inlet of the first HP pump 708, which is attached to the second motor 710. An outlet of the first HP pump 708 is coupled to an inlet of the second HP pump 712, which is attached to the third motor 714. An outlet of the second HP pump 712 is coupled to the bypass pathway 715 as well as an inlet of the FMV 718. The bypass pathway 715 includes a connection to an inlet of the BPV 716. The BPV 716 is connected to an inlet of the FMV 718 and an outlet of the FMV 718 to determine pressure by using a spring-loaded mechanism (e.g., when the pressure in the system exceeds a predetermined set point, the spring force is overcome and the BPV 716 opens). The BPV has an outlet coupled to the valve 717, which has an outlet coupled to the inlet of the second HP pump 712.

If the fuel does not enter the bypass pathway 715 because the BPV 716 is closed, the fuel flows to the inlet of the FMV 718. An outlet of the FMV 718 is coupled to an inlet of the SOOV 720. An outlet of the SOOV 720 is coupled to an inlet of the nozzle 722. An outlet of the nozzle 722 is coupled to an inlet of the combustor 724.

In operation, the LP pump 704, which is driven by the first motor 706, supplies a constant flow of fuel to the first HP pump 708. The first HP pump 708, which is driven by the second motor 710, increases the pressure of the fuel before the fuel reaches the second HP pump 712. The second HP pump 712 maintains the pressure working point at the best efficiency point.

The fifth hydrogen fuel distribution system 700 is designed such that the fuel exiting the LP pump 704 is in the liquid phase to avoid cavitation or inefficiency in the first HP pump 708. The fuel exiting the first HP pump 708 is at a higher pressure as well as in the supercritical or gaseous phase. The fuel exiting the second HP pump 712 is in the supercritical or gaseous phase at the BEP.

After the HP pump, the fuel either flows through the bypass pathway 715 to the BPV 716 before the valve 717 or to the FMV 718.

If the fuel flows to the bypass pathway 715, the BPV 716 measures the pressure differential across the FMV 718. If the pressure differential exceeds a predetermined spring-loaded force, the BPV 716 opens, allowing flow through the valve 717 and back to the inlet of the second HP pump 712, where the fuel pressure is maintained at the BEP.

If the fuel flows to the FMV 718 because the BPV 716 is closed, the FMV 718 regulates the amount of fuel through the FMV 718. The SOOV 720 then functions optionally to intervene if a rotational speed of the engine exceeds a predetermined limit based on electronic sensors and feedback through a controller or FADEC (not shown). The fuel continues its distribution path through at least one nozzle 722, which directs the flow of fuel into the combustor 724 which combusts the fuel to generate thrust in the engine (not shown).

Figure 8:
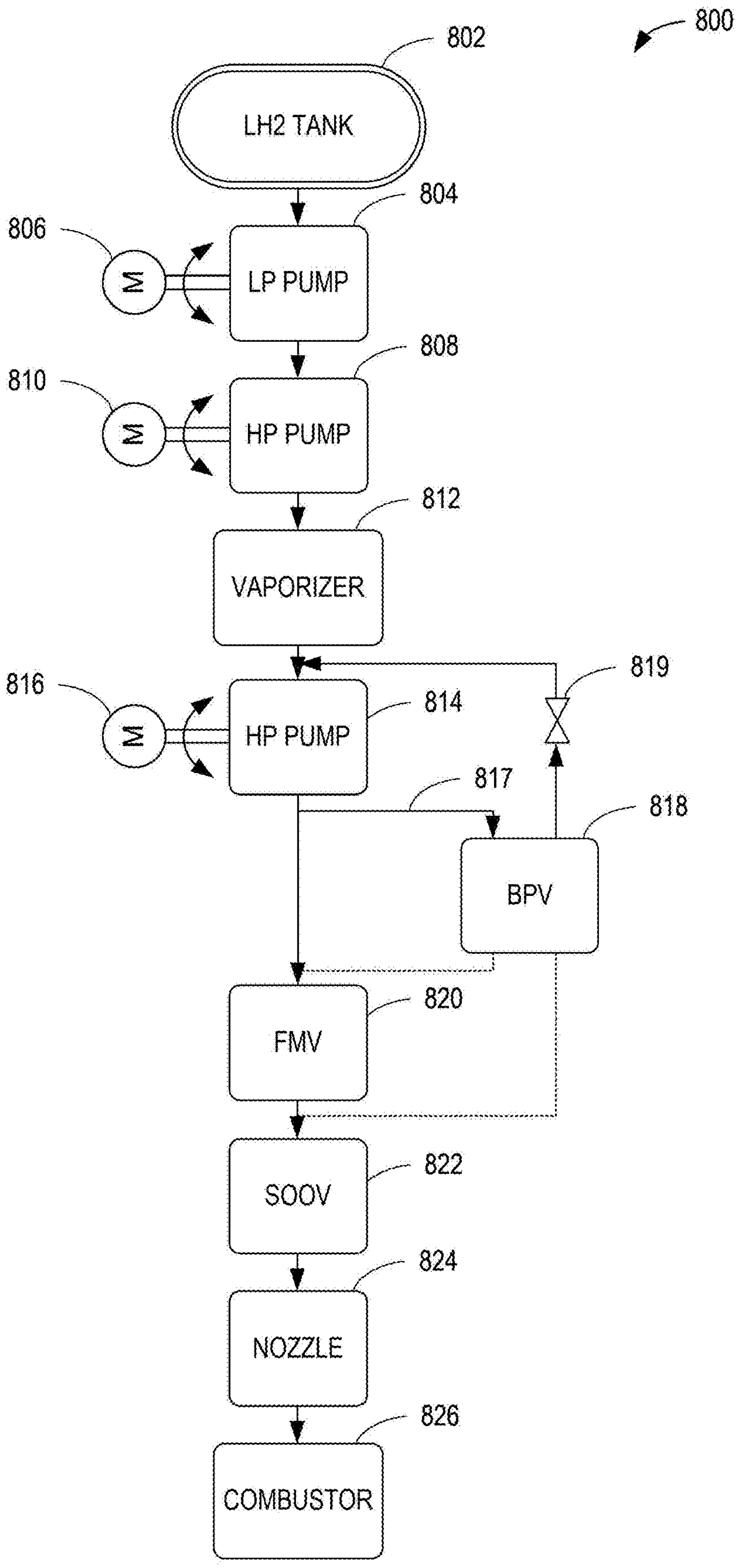
FIG. 8 is a block diagram of a first example flow of fuel from a fuel tank to a combustor with a bypass pathway and a vaporizer in between high pressure pumps.

FIG. 8 is a block diagram of a sixth hydrogen fuel distribution system 800 demonstrating example flow of fuel from a fuel tank to a combustor with a bypass pathway and a vaporizer in between high pressure pumps. The sixth hydrogen fuel distribution system 800 includes a fuel tank 802, an LP pump 804, a first motor 806, a first HP pump 808, a second motor 810, a vaporizer 812, a second HP pump 814, a third motor 816, a bypass pathway 817, a BPV 818, a valve 819, a FMV 820, a SOOV 822, a nozzle 824, and a combustor 826. In this example, the first HP pump 808 is centrifugal, whereas the second HP pump 814 is a displacement pump.

In assembly, the sixth hydrogen fuel distribution system 800 enables fuel flow from the fuel tank 802 to the combustor 826 by flowing through a sequence of components in series. The fuel tank 802 is coupled to an inlet of the LP pump 804 which is attached to the first motor 806. An outlet of the LP pump 804 is coupled to an inlet of the first HP pump 808 which is attached to the second motor 810. An outlet of the first HP pump 808 is coupled to an inlet of the vaporizer 812. An outlet of the vaporizer 812 is coupled to an inlet of the second HP pump 814, which is attached to the third motor 816. An outlet of the third HP pump 814 is coupled to an inlet of the BPV 818 through the bypass pathway 817, as well as an inlet of the FMV 820. The BPV 818 is connected to an inlet of the FMV 820 and an outlet of the FMV 820 to measure pressure. An outlet of the BPV 818 is coupled to an inlet of the valve 819. An outlet of the valve 819 is coupled to the inlet of the second HP pump 814.

If the fuel does not flow through the bypass pathway 817 because the BPV 818 is closed, the fuel flows through the inlet of the FMV 820. An outlet of the FMV 820 is coupled to an inlet of the SOOV 822. An outlet of the SOOV 822 is coupled to an inlet of the nozzle 824. An outlet of the nozzle 824 is coupled to an inlet of the combustor 826.

In operation, the LP pump 804, which is driven by the first motor 806, supplies a constant flow of fuel to the first HP pump 808. The first HP pump 708, which is driven by the second motor 710, increases the pressure of the fuel before the fuel reaches the vaporizer 812. The vaporizer 812 vaporizes the fuel and feeds the fuel into the second HP pump 814. The second HP pump 814 maintains the pressure working point at the BEP.

The sixth hydrogen fuel distribution system 800 is designed such that the fuel exiting the LP pump 804 is in the liquid phase to avoid cavitation or inefficiency in the first HP pump 808. The fuel exiting the first HP pump 808 is at a higher pressure as well as in the supercritical or gaseous phase. The fuel is then heated by the vaporizer 812 so that the fuel temperature increases and to ensure the fuel is in a vaporized state. The fuel then enters the second HP pump 814. The fuel exiting the second HP pump 814 is in the vapor (gaseous) state at the BEP.

After the second HP pump, the fuel either flows through the bypass pathway 817 to the BPV 818 before the valve 819 or to the FMV 820 based on whether the BPV 818 is open or closed.

If the fuel flows to the bypass pathway 817 because the BPV 818 is open, the BPV 818 measures the pressure differential across the FMV 820. If the pressure differential is too high (e.g., the pressure exceed the spring-loaded mechanism force), the BPV 818 opens, allowing flow through the valve 819 and back to the inlet of the second HP pump 814, where the fuel pressure is maintained at the BEP.

If the fuel flows to the FMV 820 because the BPV 818 is closed, the FMV 820 regulates the amount of fuel through the FMV 820. The SOOV 822 then functions optionally to intervene if a rotational speed of the engine exceeds a predetermined limit. The fuel continues its distribution path through at least one nozzle 824, which directs the flow of fuel into the combustor 826 which combusts the fuel to generate thrust in the engine.

Figure 9:
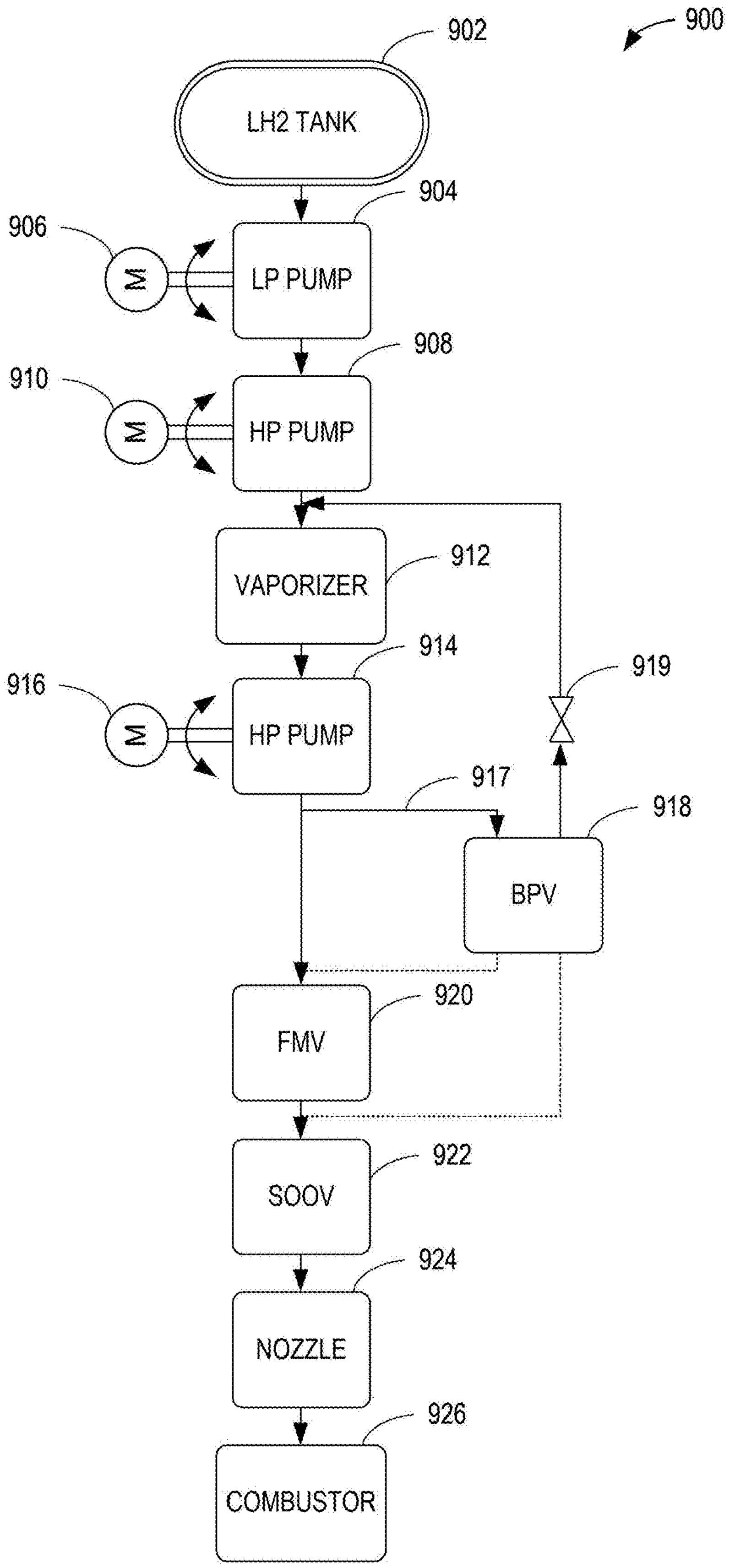
FIG. 9 is a block diagram of a first example flow of fuel from a fuel tank to a combustor with a bypass pathway and a vaporizer in between high pressure pumps.

FIG. 9 is a block diagram of a seventh hydrogen fuel distribution system 900 demonstrating example flow of fuel from a fuel tank to a combustor with a bypass pathway and a vaporizer in between high pressure pumps. The seventh hydrogen fuel distribution system 900 includes a fuel tank 902, an LP pump 904, a first motor 906, a first HP pump 908, a second motor 910, a vaporizer 912, a second HP pump 914, a third motor 916, a bypass pathway 917, a BPV 918, a valve 919, a FMV 920, a SOOV 922, a nozzle 924, and a combustor 926. In this example, the first HP pump 908 is centrifugal, whereas the second HP pump 914 is a displacement pump.

In assembly, the seventh hydrogen fuel distribution system 900 enables fuel flow from the fuel tank 902 to the combustor 926 by flowing through a sequence of components in series. The fuel tank 902 is coupled to an inlet of the LP pump 904 which is attached to the first motor 906. An outlet of the LP pump 904 is coupled to an inlet of the first HP pump 908 which is attached to the second motor 910. An outlet of the first HP pump 908 is coupled to an inlet of the vaporizer 912. An outlet of the vaporizer 912 is coupled to an inlet of the second HP pump 914, which is attached to the third motor 916. An outlet of the second HP pump 914 is coupled to an inlet of the BPV 918 through the bypass pathway 917, as well as an inlet of the FMV 920. The BPV 918 is connected to an inlet of the FMV 920 and an outlet of the FMV 920 to measure pressure. An outlet of the BPV 918 is coupled to an inlet of the valve 919. An outlet of the valve 919 is coupled to the inlet of the vaporizer 912.

If the fuel does not flow through the bypass pathway 917 because the BPV 918 is closed, the fuel flows through the inlet of the FMV 920. An outlet of the FMV 920 is coupled to an inlet of the SOOV 922. An outlet of the SOOV 922 is coupled to an inlet of the nozzle 924. An outlet of the nozzle 924 is coupled to an inlet of the combustor 926.

In operation, the LP pump 904, which is driven by the first motor 806, supplies a constant flow of fuel to the first HP pump 908. The first HP pump 708, which is driven by the second motor 910, increases the pressure of the fuel before the fuel reaches the vaporizer 912. The vaporizer 912 vaporizes the fuel and feeds the fuel into the second HP pump 914. The second HP pump 914 maintains the pressure working point at the BEP.

The seventh hydrogen fuel distribution system 900 is designed such that the fuel exiting the LP pump 904 is in the liquid phase to avoid cavitation or inefficiency in the first HP pump 908. The fuel exiting the first HP pump 908 is at a higher pressure as well as in the supercritical or gaseous phase. The fuel is then heated by the vaporizer 912 so that the fuel temperature increases and to ensure the fuel is in a vaporized state. The fuel then enters the second HP pump 914. The fuel exiting the second HP pump 914 is in the vapor (gaseous) state at the BEP.

After the second HP pump 914, the fuel either flows through the bypass pathway 917 to the BPV 918 before the valve 919 or to the FMV 920 based on whether the BPV 918 is open or closed.

If the fuel flows to the bypass pathway 917 because the BPV 918 is open, the BPV 918 measures the pressure differential across the FMV 920. If the pressure differential is great enough to exceed the predetermined spring-loaded mechanism, the BPV 918 opens, allowing flow through the valve 919 and back to the inlet of the vaporizer 912, where the fuel is heated by the vaporizer 912.

If the fuel flows to the FMV 920 because the BPV 918 is closed, the FMV 920 regulates the amount of fuel through the FMV 920. The SOOV 922 then functions optionally to intervene if a rotational speed of the engine exceeds a predetermined limit. The fuel continues its distribution path through at least one nozzle 924, which directs the flow of fuel into the combustor 926 which combusts the fuel to generate thrust in the engine.

Figure 10:
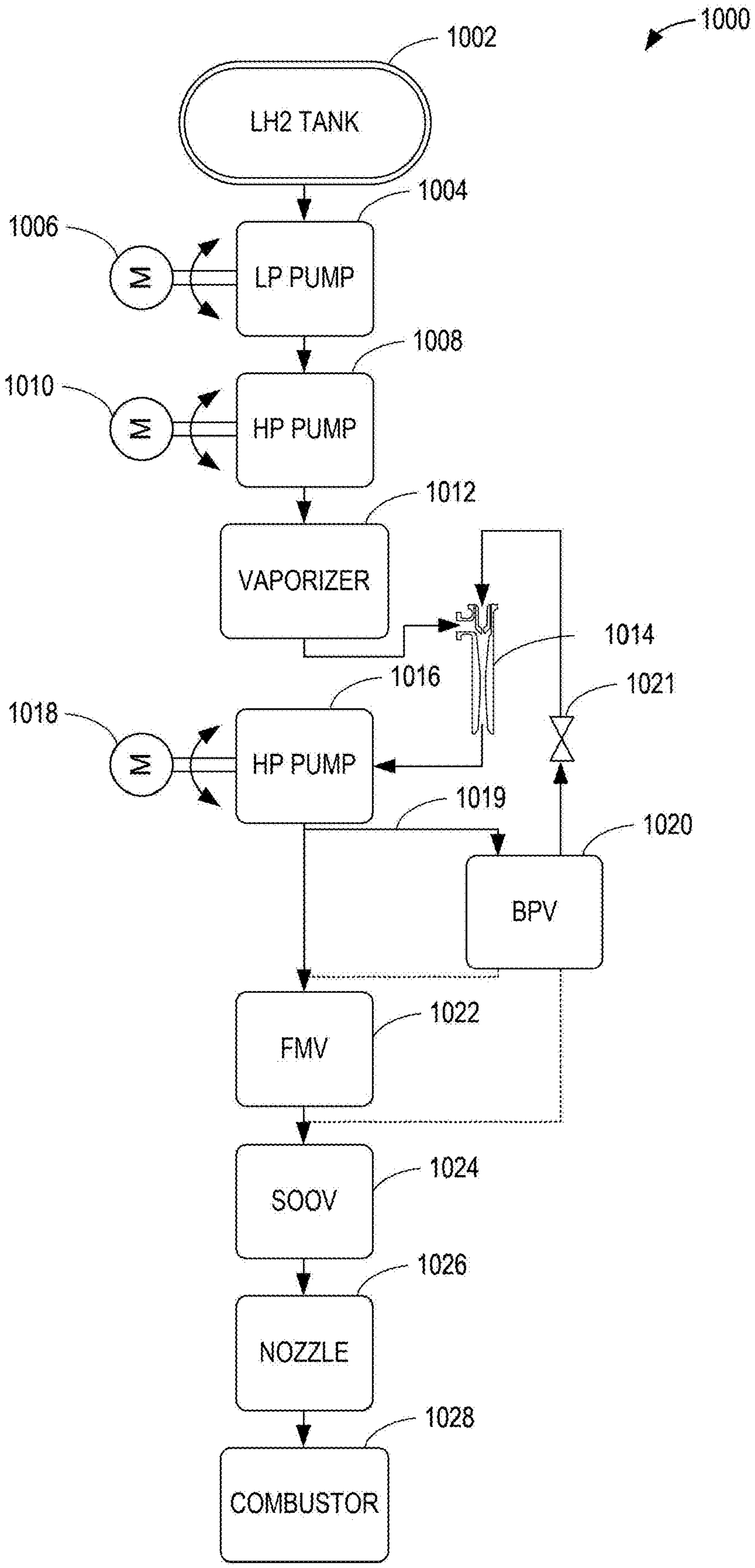
FIG. 10 is a block diagram of an example flow of fuel from a fuel tank to a combustor with an ejector.

FIG. 10 is a block diagram of an eighth hydrogen fuel distribution system 1000 demonstrating an example flow of fuel from a fuel tank to a combustor with an ejector. The eighth hydrogen fuel distribution system 1000 includes a fuel tank 1002, an LP pump 1004, a first motor 1006, a first HP pump 1008, a second motor 1010, a vaporizer 1012, an ejector 1014, a second HP pump 1016, a third motor 1018, a bypass pathway 1019, a BPV 1020, a valve 1021, a FMV 1022, a SOOV 1024, a nozzle 1026, and a combustor 1028. In this example, the first HP pump 1008 is centrifugal, whereas the second HP pump 1016 is a displacement pump.

In assembly, the eighth hydrogen fuel distribution system 1000 enables fuel flow from the fuel tank 1002 to the combustor 1028 by flowing through a sequence of components in series. The fuel tank 1002 is coupled to an inlet of the LP pump 1004, which is attached to the first motor 1006. An outlet of the LP pump 1004 is coupled to an inlet of the first HP pump 1008, which is attached to the second motor 1010. An outlet of the first HP pump 1008 is coupled to the vaporizer 1012. An outlet of the vaporizer 1012 is coupled to an inlet of the ejector 1014. An outlet of the ejector 1014 is coupled to an inlet of the second HP pump 1016, which is attached to the third motor. An outlet of the second HP pump is coupled to the bypass pathway 1019 and an inlet of the FMV 1022.

Following the flow of fuel through the bypass pathway 1019, the outlet of the second HP pump 1016 is coupled to the bypass pathway 1019. The bypass pathway 1019 leads to an inlet of the BPV 1020. The BPV 1020 measures pressure at an inlet of the FMV 1022 and an outlet of the FMV 1022. An outlet of the BPV is coupled to an inlet of the valve 1021. An outlet of the valve 1021 is coupled to the inlet of the ejector 1014.

Following the flow of fuel from the second HP pump 1016 to the FMV 1022, the outlet of the second HP pump 1016 is coupled to the inlet of the FMV 1022. The outlet of the FMV 1022 is coupled to an inlet of the SOOV 1024. An outlet of the SOOV 1024 is coupled to an inlet of the nozzle 1026. An outlet of the nozzle 1026 is coupled to an inlet of the combustor 1028.

In operation, the LP pump 1004, which is driven by the first motor 1006, supplies a constant flow of fuel to the first HP pump 1008. The first HP pump 1008, which is driven by the second motor 1010, increases the pressure of the fuel before the fuel reaches the vaporizer 1012. The vaporizer 1012 vaporizes the fuel and feeds the vaporized fuel into the second HP pump 1016. The second HP pump 1016 maintains the pressure working point at the BEP. After the second HP pump, the fuel flows through the inlet of the ejector 1014, where the ejector 1014 draws fuel into the second HP pump 1016.

The eighth hydrogen fuel distribution system 1000 is designed such that the fuel exiting the LP pump 1004 is in the liquid phase to avoid cavitation or inefficiency in the first HP pump 1008. The fuel exiting the first HP pump 1008 is at a higher pressure as well as in the supercritical or gaseous phase. The fuel is then heated by the vaporizer 1012 so that the fuel temperature increases and to ensure the fuel is in a vaporized state. The fuel then enters the second HP pump 1016 by being drawn through the ejector 1014. The fuel exiting the second HP pump 1016 is in the vapor (gaseous) state at the BEP.

If the fuel flows to the bypass pathway 1019, the BPV 1020 measures the pressure differential across the FMV 1022. If the pressure differential is greater than the predefined spring-loaded mechanism force, the BPV 1020 opens, allowing flow through the valve 1021 and back to the second inlet of the ejector 1014, where the ejector 1014 draws fuel back into the second HP pump 1016.

If the fuel flows to the FMV 1022 because the BPV 1020 is closed, the FMV 1022 regulates the amount of fuel through the FMV 1022. The SOOV 1024 then functions optionally to intervene if a rotational speed of the engine exceeds a predetermined limit. The fuel continues its distribution path through at least one nozzle 1026, which directs the flow of fuel into the combustor 1028 which combusts the fuel to generate thrust in the engine.

Figure 11:
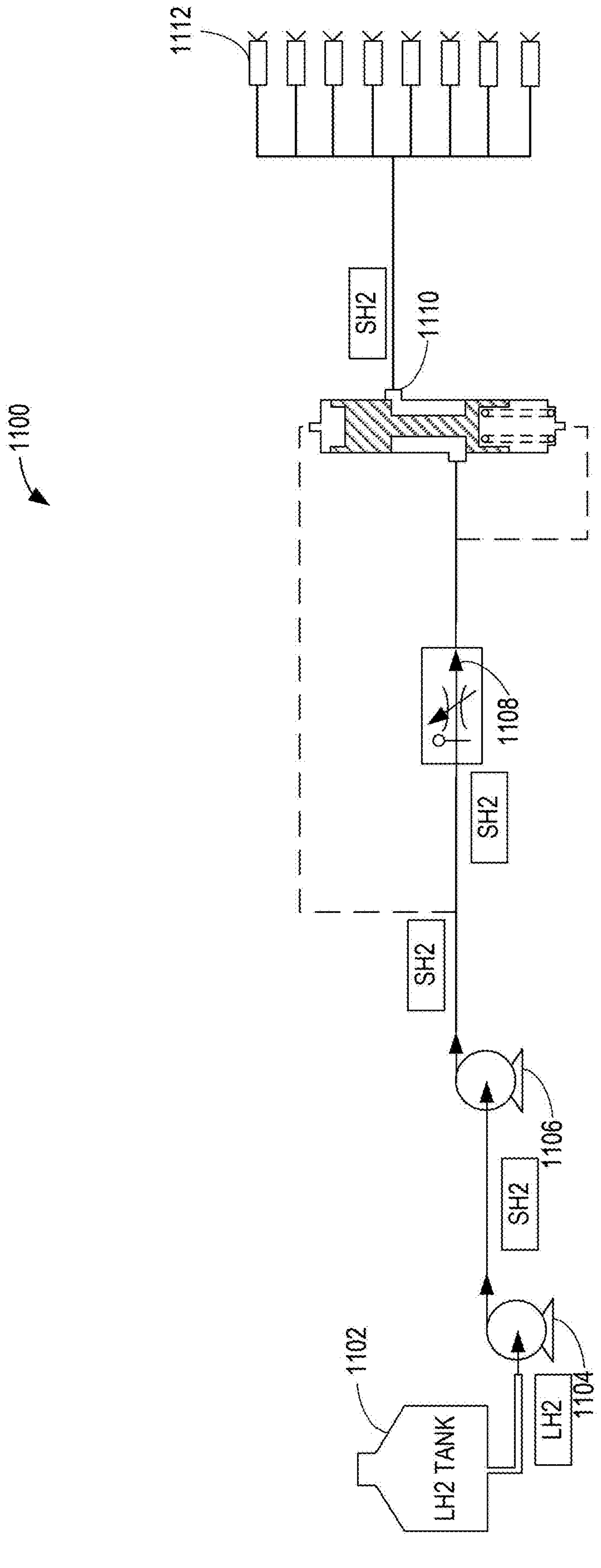
FIG. 11 is a block diagram of a ninth example hydrogen fuel distribution system.

FIG. 11 is a schematic of a ninth hydrogen fuel distribution system 1100. The ninth hydrogen fuel distribution system 1100 includes a fuel tank 1102, a first pump 1104, a second pump 1106, a FMV 1108, a throttling valve 1110, and at least one nozzle 1112. In this example, the first and second pumps 1104, 1106 are centrifugal.

In assembly, the fuel tank 1102 is coupled to an inlet of the first pump 1104. An outlet of the first pump 1104 is coupled to an inlet of the second pump 1106. An outlet of the second pump 1106 is coupled to an inlet of the FMV 1108. An outlet of the FMV 1108 is coupled to the throttling valve 1110, which is connected to the inlet of the FMV 1108 and the outlet of the FMV 1108 to measure the pressure differential across the FMV 1108. An outlet of the throttling valve 1110 is coupled to the at least one nozzle 1112.

In operation, fuel in a liquid state is pumped by the first pump 1104 from the fuel tank 1102 to the second pump 1106 at a constant flow. The second pump 1106 maintains the pressure working point at the BEP. The fuel at the outlet of the second pump 1106 is at a higher pressure as well as in the supercritical or gaseous state. The fuel then flows through the fuel metering valve 1108, which regulates the amount of fuel flowing through the FMV 1108 and to the inlet of the throttling valve 1110. The throttling valve 1110 measures the pressure differential across the FMV 1108 through a hydromechanical mechanism. The throttling valve 1110 regulates the fuel flow to the at least one nozzle 1112 based on the pressure differential across the FMV 1108. In this configuration, no vaporizer is included because the inefficiency of the second pump 1106 adds enough heat to vaporize the fuel.

Figure 12:
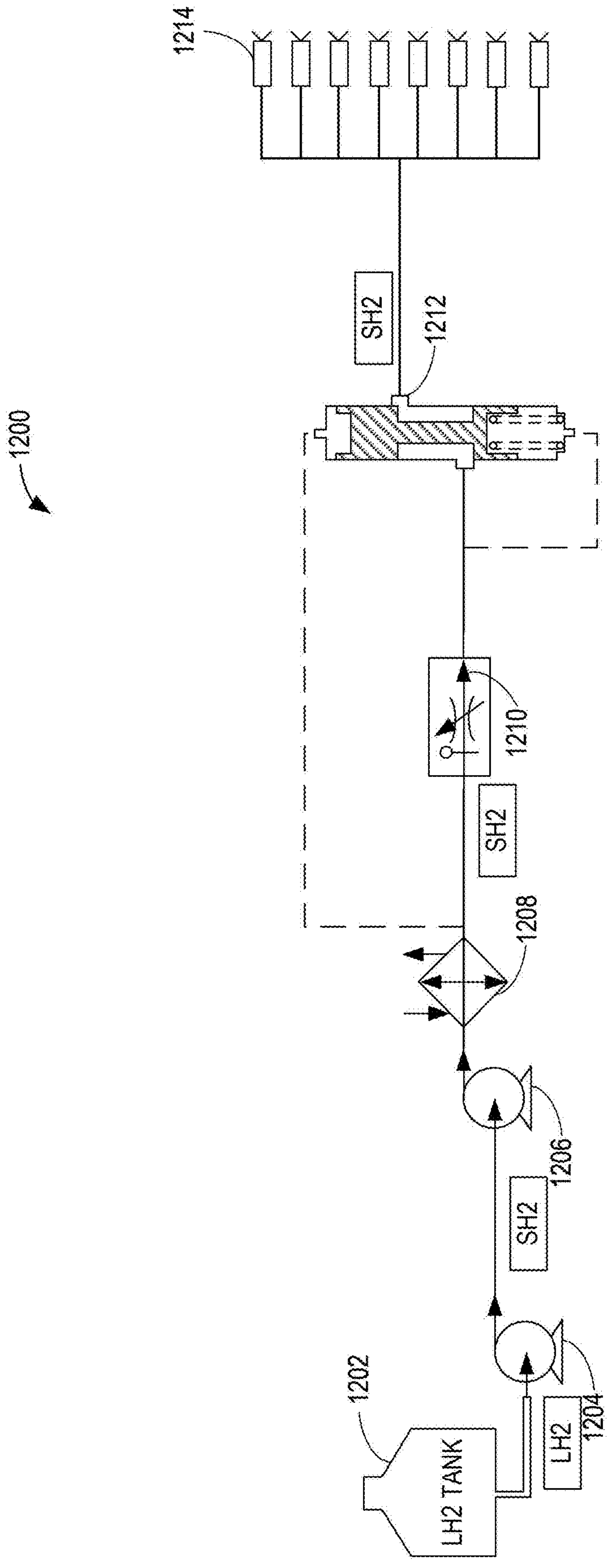
FIG. 12 is a block diagram of a tenth example hydrogen fuel distribution system.

FIG. 12 is a schematic of a tenth hydrogen fuel distribution system 1200. The tenth hydrogen fuel distribution system 1200 includes a fuel tank 1202, a first pump 1204, a second pump 1206, a vaporizer 1208, a FMV 1210, a throttling valve 1212, and at least one nozzle 1214. In this example, the first and second pumps 1204, 1206 are centrifugal.

In assembly, the fuel tank 1202 is coupled to an inlet of the first pump 1204. An outlet of the first pump 1204 is coupled to an inlet of the second pump 1206. An outlet of the second pump 1206 is coupled to an inlet of the vaporizer 1208. An outlet of the vaporizer 1208 is coupled to an inlet of the FMV 1210. An outlet of the FMV 1210 is coupled to an inlet of the throttling valve 1212, which is connected to the inlet of the FMV 1210 and the outlet of the FMV 1210 to measure the pressure differential across the FMV 1210 through a hydromechanical connection to measure the pressure. An outlet of the throttling valve 1212 is coupled to the at least one nozzle 1214.

In operation, fuel is in a liquid state and pumped by the first pump 1204 from the fuel tank 1202 to the second pump 1206 at a constant flow. The second pump 1206 maintains the pressure working point at the BEP. The fuel at the outlet of the second pump 1206 is at a higher pressure as well as in the supercritical or gaseous state. The fuel is pumped to the vaporizer 1208, which vaporizes the fuel into a vapor state. The vaporized fuel then flows through the fuel metering valve 1210, which regulates the amount of fuel flowing through the FMV 1210 and to the inlet of the throttling valve 1212. The throttling valve 1212 measures the pressure differential across the FMV 1210. The throttling valve 1212 regulates the fuel flow to the at least one nozzle 1214 based on the pressure differential across the FMV 1210 by adjusting the size of the opening associated with the throttling valve 1212.

Figure 13:
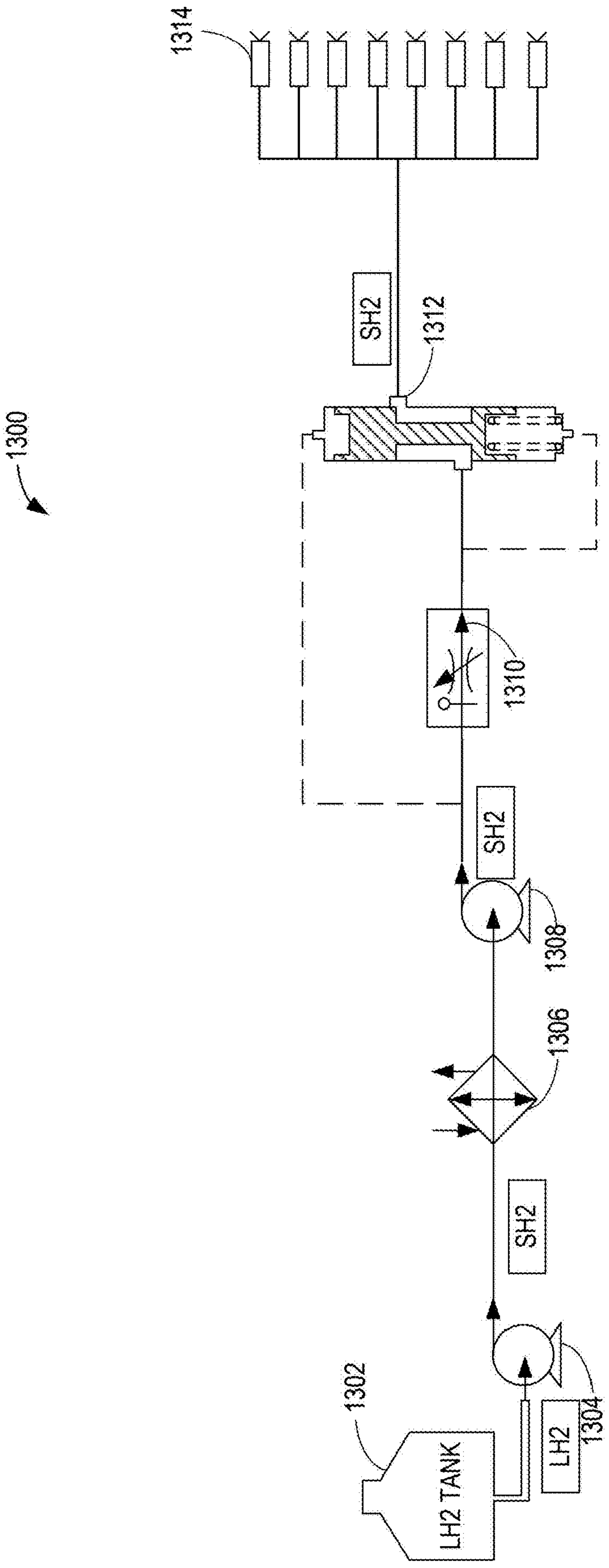
FIG. 13 is a block diagram of an eleventh example hydrogen fuel distribution system.

FIG. 13 is a schematic of an eleventh hydrogen fuel distribution system 1300. The eleventh hydrogen fuel distribution system 1300 includes a fuel tank 1302, a first pump 1304, a vaporizer 1306, a second pump 1308, a FMV 1310, a throttling valve 1312, and at least one nozzle 1314. In this example, the first and second pumps 1304, 1308 are centrifugal.

In assembly, the fuel tank 1302 is coupled to an inlet of the first pump 1304. An outlet of the first pump 1304 is coupled to an inlet of the vaporizer 1306. An outlet of the vaporizer 1306 is coupled to an inlet of the second pump 1308. An outlet of the second pump 1308 is coupled to an inlet of the FMV 1310. An outlet of the FMV 1310 is coupled to an inlet of the throttling valve 1312, which is connected to the inlet of the FMV 1310 and the outlet of the FMV 1310 to measure a pressure differential across the FMV 1310. An outlet of the throttling valve 1312 is coupled to at least one nozzle 1314.

In operation, fuel in a liquid state is pumped by the first pump 1304 from the fuel tank 1102 to the vaporizer 1306 at a constant flow. The vaporizer 1306 heats and vaporizes the fuel into a vapor state. The second pump 1308 then pressurizes the vaporized fuel further and pumps the fuel to the FMV 1310. The fuel then flows through the fuel metering valve 1310, which regulates the amount of fuel flowing through the FMV 1310 and to the inlet of the throttling valve 1312 in response to engine conditions. The FMV 1310 receives a signal from a controller or FADEC (not shown) which takes a control system input, determines fuel requirements, and sends a signal to the FMV to open or close based on a calculated fuel regulation. The throttling valve 1312 hydromechanically measures the pressure differential across the FMV 1310. The throttling valve 1312 regulates the fuel flow to the at least one nozzle 1314 based on the pressure differential across the FMV 1310 by adjusting the opening of the throttling valve 1312 based on the measured pressure differential across the FMV 1310.

Figure 14:
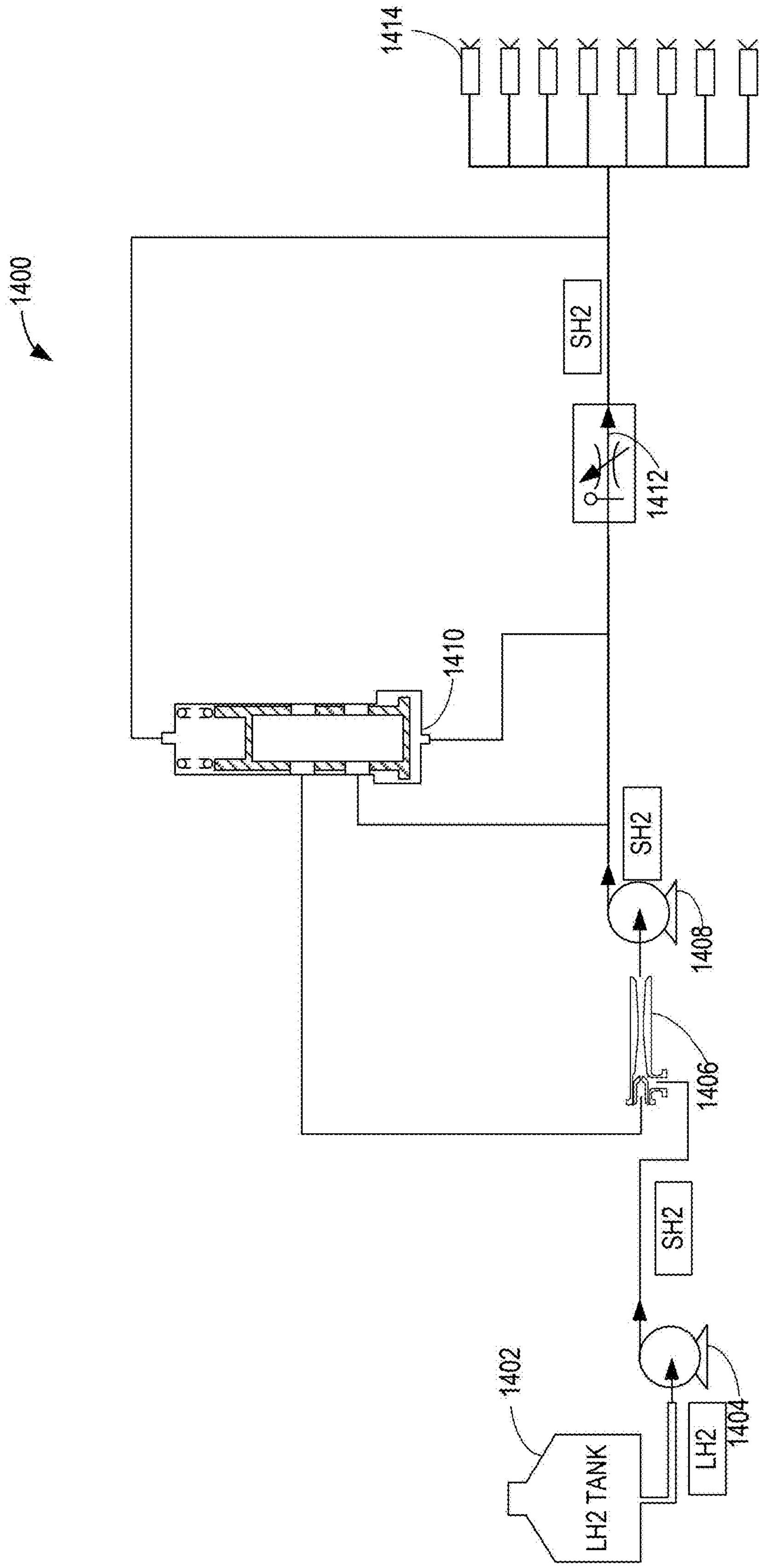
FIG. 14 is a block diagram of a twelfth example hydrogen fuel distribution system.

FIG. 14 is a schematic of a twelfth hydrogen fuel distribution system 1400. The twelfth hydrogen fuel distribution system 1400 includes a fuel tank 1402, a first pump 1404, an ejector 1406, a second pump 1408, a BPV 1410, a FMV 1412, and at least one nozzle 1414. In this example, the first pump 1404 is centrifugal, whereas the second pump 1408 is a displacement pump.

In assembly, the fuel tank 1402 is coupled to an inlet of the first pump 1404. An outlet of the first pump 1404 is coupled to a first inlet of the ejector 1406. An outlet of the ejector 1406 is coupled to an inlet of the second pump 1408. An outlet of the second pump 1408 is coupled to an inlet of the BPV 1410 and an inlet of the FMV 1412. Following the pathway of the BPV 1410, an outlet of the BPV 1410 is coupled to a second inlet of the ejector 1406. The BPV 1410 is also connected to an inlet of the FMV 1412 and the outlet of the FMV 1412 to measure pressure at the inlet of the FMV 1412 and at the outlet of the FMV 1412. Following the pathway of the FMV 1412, the outlet of the second pump is coupled to the inlet of the FMV 1412. An outlet of the FMV 1412 is coupled to an inlet of the at least one nozzle 1414.

In operation, fuel in a liquid state is pumped by the first pump 1404 from the fuel tank 1402 to the first inlet of the ejector 1406 at a constant flow. The ejector 1406 then draws fuel into the second pump 1408. The second pump 1408 maintains the pressure working point at the BEP. The fuel at the outlet of the second pump 1408 is at a higher pressure as well as in the supercritical or gaseous state. The fuel then flows either to the inlet of the BPV 1410 or to the FMV 1412.

If fuel flows to the BPV 1410 because the BPV 1410 is open, the BPV 1410 measures the pressure differential across the FMV 1412. If the pressure differential is greater than a predetermined spring-loaded mechanism force, the BPV 1410 opens, allowing flow back to the second inlet of the ejector 1406, where the ejector 1406 draws fuel in a more reliable way into the second pump 1408.

If fuel flows to the fuel metering valve 1412 because the BPV 1410 is closed, the FMV 1412 regulates the amount of fuel flowing through the FMV 1412 allows flow of fuel to the inlet of the at least one nozzle 1414.

Between the different configurations and embodiments disclosed herein, the differentiator for use is dependent on the fuel pump to be used. The position of the vaporizer with respect to the bypass system depends on the ability to efficiently control the heat in the system. The usage of a jet pump is tolerated if the weight added to the jet pipe is lower than an increase of the weight of the pump to supply the unrecovered pressure.

Example methods, apparatus, systems, and articles of manufacture to distribute fuel are disclosed herein. Further examples and combinations thereof include the following:

From the foregoing, it will be appreciated that example systems, apparatus, articles of manufacture, and methods have been disclosed that allows maintenance of the best efficiency point at different engine conditions for dynamic pumps and diverts the excess of flow with displacement pumps. Disclosed systems, apparatus, articles of manufacture, and methods improve the efficiency of fuel distribution systems by decoupling the flow delivered by pumps from the engine fuel flow demand and sets a constant delta pressure across the fuel metering valve. Disclosed systems, apparatus, articles of manufacture, and methods are accordingly directed to one or more improvement(s) in the operation of a machine such as a computer or other electronic and/or mechanical device.

An example apparatus includes a fuel distribution system for an engine, the fuel distribution system comprising a first pump downstream of a fuel tank, a first motor coupled to the first pump, a second pump downstream of the first pump, a second motor coupled to the second pump, a third pump downstream of the second pump, the third pump having an inlet and an outlet, a bypass pathway from the outlet of the third pump to the inlet of the third pump, and a bypass pathway, the recirculation valve in line with the bypass pathway.

The example apparatus of any preceding clause, further including an actuator coupled to the recirculation valve, the actuator to actuate the recirculation valve.

The example apparatus of any preceding clause, further including a throttling valve downstream of the third pump, the throttling valve coupled to an inlet of a fuel metering valve and an outlet of the fuel metering valve.

The example apparatus of any preceding clause, further including a full authority digital engine control (FADEC), the FADEC to change a state of the recirculation valve depending on a measure of a flow through the throttling valve, the FADEC to measure the flow through the throttling valve.

The example apparatus of any preceding clause, further including a throttling valve downstream of a fuel metering valve, the throttling valve coupled to an inlet of a fuel metering valve and an outlet of the fuel metering valve.

The example apparatus of any preceding clause, further including a bypass valve downstream of the third pump and upstream of the recirculation valve, the bypass valve coupled to an inlet of a fuel metering valve and an outlet of the fuel metering valve.

The example apparatus of any preceding clause, wherein the fuel distribution system retains at least one of a two-phase or a cryogenic fuel.

The example apparatus of any preceding clause, wherein the at least one of a two-phase or a cryogenic fuel includes liquified natural gas, methane, ethane, and propane.

An example apparatus includes a fuel distribution system comprising a first pump downstream of a fuel tank, the first pump having an inlet and an outlet, a first motor coupled to the first pump, a second pump downstream of the first pump, the second pump having an inlet and an outlet, the inlet of the second pump coupled to the outlet of the first pump, a second motor coupled to the second pump, a third pump downstream of the second pump, the third pump having an inlet and an outlet, the inlet of the third pump coupled to the outlet of the second pump, and a fuel assembly including a vaporizer having an inlet and an outlet, a fuel metering valve having an inlet or an outlet, and at least one of a bypass valve or a throttling valve.

The example apparatus of any preceding clause, further including a bypass pathway, the bypass pathway coupled from the outlet of the third pump to the inlet of the third pump.

The example apparatus of any preceding clause, wherein the bypass pathway includes a recirculation valve, the recirculation valve to allow flow from the outlet of the third pump to the inlet of the third pump.

The example apparatus of any preceding clause, wherein the recirculation valve is coupled to an actuator.

The example apparatus of any preceding clause, further including a bypass valve downstream of the third pump and upstream of the recirculation valve, the bypass valve coupled to the inlet of the fuel metering valve and the outlet of the fuel metering valve.

The example apparatus of any preceding clause, wherein the fuel distribution system retains at least one of a two-phase or a cryogenic fuel.

An example apparatus includes a gas turbine engine comprising a fuel tank to retain a fuel, a combustor to combust the fuel, a fuel distribution system to distribute the fuel, the fuel distribution system including a first pump downstream of the fuel tank, a first motor coupled to the first pump, a second pump downstream of the first pump, a second motor coupled to the second pump, a third pump downstream of the second pump, the third pump having an inlet and an outlet, and a fuel assembly including a vaporizer having an inlet and an outlet, a fuel metering valve having an inlet or an outlet, and at least one of a bypass valve or a throttling valve.

The example apparatus of any preceding clause, further including a bypass pathway, the bypass pathway coupled from the outlet of the third pump to the inlet of the third pump.

The example apparatus of any preceding clause, wherein the bypass pathway includes a recirculation valve, the recirculation valve to allow flow from the outlet of the third pump to the inlet of the third pump.

The example apparatus of any preceding clause, wherein the recirculation valve is coupled to an actuator.

The example apparatus of any preceding clause, further including a bypass valve downstream of the third pump and upstream of the recirculation valve, the bypass valve coupled to the inlet of the fuel metering valve and the outlet of the fuel metering valve.

The example apparatus of any preceding clause, wherein the fuel is at least one of a two-phase or cryogenic fuel. The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A fuel distribution system for an engine, the fuel distribution system comprising:

a first pump downstream of a fuel tank and connected thereto;

a first motor coupled to the first pump, the first motor configured to operate the first pump;

a second pump downstream of the first pump;

a second motor coupled to the second pump, the second motor configured to operate the second pump;

a third pump downstream of the second pump, the third pump having an inlet and an outlet;

a bypass pathway from the outlet of the third pump to the inlet of the third pump, the first pump and the second pump outside of the bypass pathway;

a recirculation valve in line with the bypass pathway; and a bypass valve in line with the bypass pathway downstream of the third pump and upstream of the recirculation valve.

2. The fuel distribution system of claim 1, further including an actuator coupled to the recirculation valve, the actuator configured to actuate the recirculation valve.

3. The fuel distribution system of claim 2, further including a throttling valve downstream of the third pump, the throttling valve coupled to an inlet of a fuel metering valve and an outlet of the fuel metering valve.

4. The fuel distribution system of claim 3, further including a full authority digital engine control (FADEC), the FADEC configured to change a state of the recirculation valve depending on a measure of a flow through the throttling valve, the FADEC further configured to measure the flow through the throttling valve.

5. The fuel distribution system of claim 2, further including a throttling valve downstream of a fuel metering valve, the throttling valve coupled to an inlet of the fuel metering valve and an outlet of the fuel metering valve.

6. The fuel distribution system of claim 1, wherein the bypass valve is coupled to an inlet of a fuel metering valve and an outlet of the fuel metering valve.

7. The fuel distribution system of claim 1, wherein the fuel distribution system retains at least one of a two-phase fuel or a cryogenic fuel.

8. The fuel distribution system of claim 7, wherein the at least one of the two-phase fuel or the cryogenic fuel includes liquified natural gas, methane, ethane, or propane.

9. The fuel distribution system of claim 1, including:

a vaporizer having an inlet and an outlet; and a fuel metering valve having an inlet and an outlet, the fuel metering valve downstream of the vaporizer.

10. The fuel distribution system of claim 9, wherein the recirculation valve is configured to selectively allow flow from the outlet of the third pump to the inlet of the third pump.

11. The fuel distribution system of claim 10, wherein the bypass valve is coupled to the inlet of the fuel metering valve and the outlet of the fuel metering valve.

12. A gas turbine engine comprising:

a fuel tank to retain a fuel;

a combustor to combust the fuel;

a fuel distribution system to distribute the fuel, the fuel distribution system including:

a first pump downstream of the fuel tank;

a first motor coupled to the first pump; a second pump downstream of the first pump;

a second motor coupled to the second pump;

a third pump downstream of the second pump, the third pump having an inlet and an outlet;

a bypass pathway from the outlet of the third pump to the inlet of the third pump, the first pump and the second pump outside of the bypass pathway;

a recirculation valve in line with the bypass pathway; and a fuel assembly including:

a vaporizer having an inlet and an outlet;

a fuel metering valve having an inlet or an outlet, the fuel metering valve downstream of the vaporizer; and a bypass valve, wherein the bypass valve is in line with the bypass pathway downstream of the third pump and upstream of the recirculation valve.

13. The gas turbine engine of claim 12, wherein the recirculation valve is configured to selectively allow flow from the outlet of the third pump to the inlet of the third pump.

14. The gas turbine engine of claim 13, wherein the recirculation valve is coupled to an actuator.

15. The gas turbine engine of claim 13, wherein the bypass valve is coupled to the inlet of the fuel metering valve and the outlet of the fuel metering valve.

16. The gas turbine engine of claim 12, wherein the fuel is at least one of a two-phase or cryogenic fuel.

* * * * *